US011792792B2

(12) United States Patent
Oved et al.

(10) Patent No.: US 11,792,792 B2
(45) Date of Patent: Oct. 17, 2023

(54) REDUCING DOWNLOAD CONTROL INFORMATION FOR RETRANSMISSION SCHEDULING IN MULTI-INCREMENTAL REDUNDANCY SCHEME

(71) Applicant: QUALCOMM Incorporated, San Diego, CA (US)

(72) Inventors: Tal Oved, Modiin (IL); Gideon Shlomo Kutz, Ramat Hasharon (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 44 days.

(21) Appl. No.: 17/330,153

(22) Filed: May 25, 2021

(65) Prior Publication Data
US 2022/0386341 A1 Dec. 1, 2022

(51) Int. Cl.
*H04W 72/12* (2023.01)
*H04L 1/18* (2023.01)
(Continued)

(52) U.S. Cl.
CPC ....... *H04W 72/1273* (2013.01); *H04L 1/1812* (2013.01); *H04W 72/23* (2023.01)

(58) Field of Classification Search
CPC ... H04W 28/04; H04W 72/04; H04W 72/042; H04W 88/08; H04W 72/1273; H04W 72/1289; H04L 5/0007; H04L 1/1812
(Continued)

(56) References Cited

U.S. PATENT DOCUMENTS

| 8,589,753 B2 * | 11/2013 | Terry ................ H04W 72/0446 714/751 |
| 2011/0299500 A1 * | 12/2011 | Papasakellariou .... H04L 1/1671 370/329 |

(Continued)

OTHER PUBLICATIONS

3GPP TSG RAN WG1 Meeting #89, Hangzhou, P.R. China, May 15-19, 2017, R1-1708484, Source: NTT Docomo, Inc., Title: CBG based (re)transmission, preemption indication and subsequent transmission in NR, Agenda item: 7.1.3.3.5. (Year: 2017).*

(Continued)

*Primary Examiner* — Peter G Solinsky
*Assistant Examiner* — Sanjay K Dewan
(74) *Attorney, Agent, or Firm* — Arent Fox, LLP

(57) ABSTRACT

Example aspects include a method, apparatus, and computer-readable medium for scheduling transmissions of transport blocks (TBs) at a base station of a wireless communication network, comprising accessing static transmission information indicating configuration information of TB transmissions. The aspects further include transmitting, to a user equipment (UE), first downlink control information (DCI) corresponding to a first transmission. Additionally, the aspects include transmitting, to the UE according to the static transmission information and the first DCI, the first transmission comprising at least a portion of encoded bits of the TB. Additionally, the aspects include receiving, from the UE, an indication of at least one code block that failed to be successfully decoded. Additionally, the aspects include transmitting, to the UE, second DCI corresponding to a second transmission. Additionally, the aspects include retransmitting, to the UE according to the static transmission information, the first DCI, and the second DCI.

28 Claims, 13 Drawing Sheets

(51) Int. Cl.
*H04W 72/1273* (2023.01)
*H04L 1/1812* (2023.01)
*H04W 72/23* (2023.01)

(58) Field of Classification Search
USPC .......................................................... 370/329
See application file for complete search history.

(56) References Cited

U.S. PATENT DOCUMENTS

| | | | | |
|---|---|---|---|---|
| 2012/0300733 | A1* | 11/2012 | Pelletier | H04L 5/0005 370/329 |
| 2013/0028213 | A1* | 1/2013 | Ko | H04B 7/0413 370/329 |
| 2013/0315180 | A1* | 11/2013 | Papasakellariou | H04W 72/04 370/329 |
| 2015/0195818 | A1* | 7/2015 | Davydov | H04L 5/0046 370/329 |
| 2015/0296518 | A1* | 10/2015 | Yi | H04W 72/0473 370/336 |
| 2015/0358111 | A1* | 12/2015 | Marinier | H04L 1/0003 370/329 |
| 2020/0059327 | A1* | 2/2020 | Kini | H04L 1/1812 |
| 2020/0275474 | A1* | 8/2020 | Chen | H04L 1/1607 |
| 2022/0140951 | A1* | 5/2022 | He | H04L 5/0055 370/329 |
| 2022/0140954 | A1* | 5/2022 | Kim | H04B 7/024 370/329 |

OTHER PUBLICATIONS

3GPP TSG-RAN WG2 # 113-e, E-meeting, Jan. 2021, R2-2100275, Agenda item: 8.15.2.3, Source: OPPO, Title: Discussion on network involvement for SL related DRX. (Year: 2021).*

3GPP TSG-RAN WG2 Meeting #113-e, E-Meeting, Jan. 25-Feb. 5, 2021, R2-2100795, Source: vivo, Title: SL DRX remaining issues, Agenda item: 8.15.2.1. (Year: 2021).*

3GPP TSG-RAN WG2 # 110-e, Online, Jun. 1-12, 2020, R2-2005720, Agenda item: 6.4.3.1, Source: LG Electronics, Inc., Title: Report of MAC issues (LG). (Year: 2020).*

International Search Report and Written Opinion—PCT/US2022/071663—ISA/EPO—dated Jul. 27, 2022.

LG Electronics Inc (Rapporteur): "Report of [Post109bis-e][957][V2X]: MAC Issues (LG)", 3GPP Draft, R2-2005720, 3GPP TSG-RAN WG2 #110-e, 3rd Generation Partnership Project (3GPP), Mobile Competence Centre, 650, Route Des Lucioles, F-06921 Sophia-Antipolis Cedex, France, vol. RAN WG2, no. Online, Jun. 1, 2020-Jun. 12, 2020, May 29, 2020 (May 29, 2020), XP051892161, 97 Pages, Sections 5.7, 5.22.1.1 and 5.x.1.7.

OPPO: "Discussion on Network Involvement for SL Related DRX", 3GPP TSG-RAN WG2 #113-e, R2-2100275, 3rd Generation Partnership Project (3GPP), Mobile Competence Centre, 650, Route Des Lucioles, F-06921 Sophia-Antipolis Cedex, France, vol. RAN WG2, No. E-meeting, Jan. 1, 2021, Jan. 15, 2021, XP051973475, 4 Pages.

VIVO: "SL DRX Remaining Issues", 3GPP TSG•RAN WG2 Meeting #113-e, R2-2100795, 3rd Generation Partnership Project (3GPP), Mobile Competence Centre, 650, Route Des Lucioles, F-06921 Sophia-Antipolis Cedex, France, vol. RAN WG2, No. E-Meeting, Jan. 25, 2021-Feb. 5, 2021, Jan. 15, 2021, XP051973902, 3 Pages.

International Search Report and Written Opinion—PCT/US2022/071706—ISA/EPO—dated Jul. 28, 2022.

NTT Docomo, et al., "CBG Based (Re)Transmission, Preemption Indication and Subsequent Transmission in NR", 3GPP TSG RAN WG1 Meeting #89, 3GPP Draft; R1-1708484, 3rd Generation Partnership Project (3GPP), Mobile Competence Centre; 650, Route Des Lucioles; F-06921 Sophia-Antipolis Cedex; France, vol. RAN WG1, No. Hangzhou; May 15, 2017-May 19, 2017, May 14, 2017 (May 14, 2017), pp. 1-8, XP051273676, sections 2 and 5.

* cited by examiner

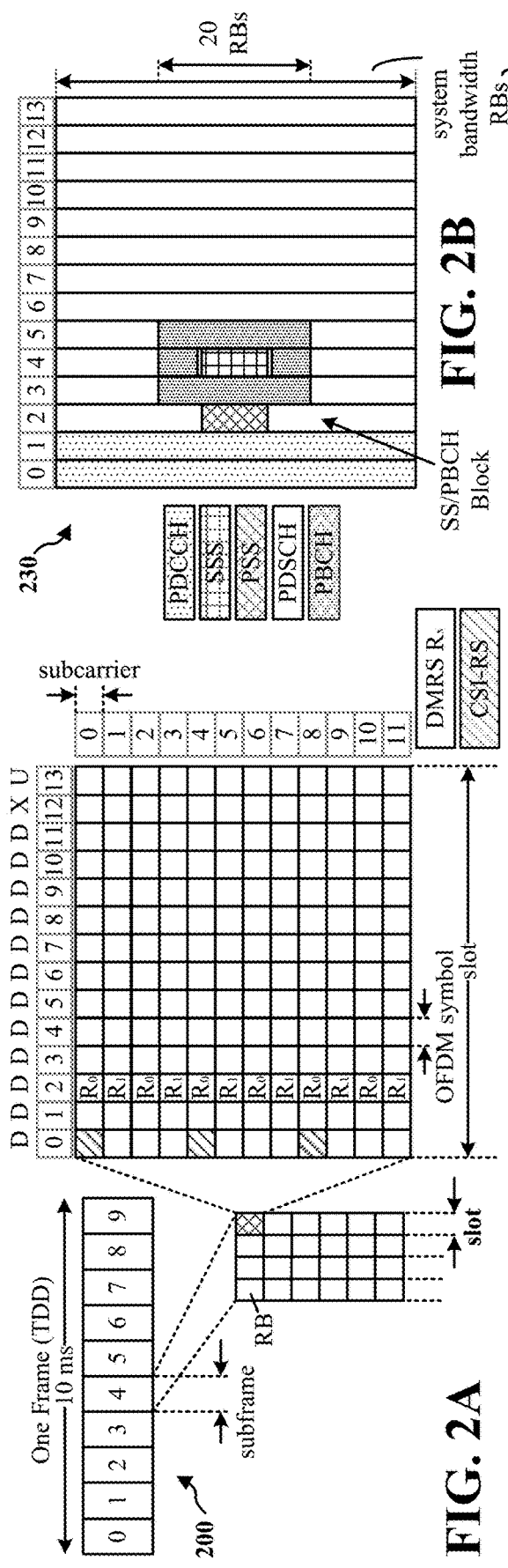
FIG. 2A
FIG. 2B
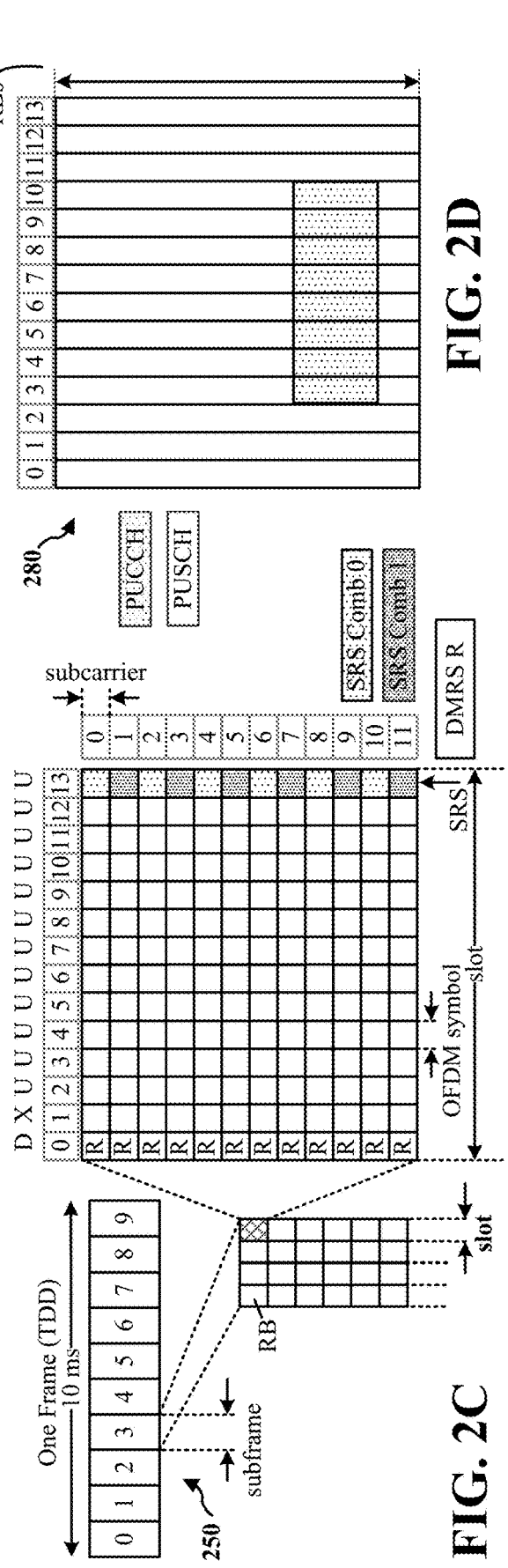
FIG. 2C
FIG. 2D

FIG. 4

Key: (Transport Block No. / Transmission No.)

- TB0 / TX5
- TB1 / TX4
- TB2 / TX3
- TB3 / TX2
- TB4 / TX1
- TB5 / TX0

| | Option A | Option B | Option C | Option D |
|---|---|---|---|---|
| Static Transmission Information | Single Set of Coding Parameters and Allocated Partial Sizes | Multiple Sets of Coding Parameters and Allocated Partial Sizes | Multiple Sets of Coding Parameters and Allocated Partial Sizes | Multiple Sets of Coding Parameters and Allocated Partial Sizes |
| Initial Transmission Information | Initial MCS | Initial MCS Set Selection | Initial MCS Set Selection Overriding Values | Initial MCS Set Selection Overriding Values |
| Dynamic Retransmission Information | TB Identifier (HARQ process) TX Number CBG/CB Bitmap | TB Identifier (HARQ process) TX Number CBG/CB Bitmap | TB Identifier (HARQ process) TX Number CBG/CB Bitmap | TB Identifier (HARQ process) TX Number CBG/CB Bitmap Overriding Values |

FIG. 5

REDUCING DOWNLOAD CONTROL INFORMATION FOR RETRANSMISSION SCHEDULING IN MULTI-INCREMENTAL REDUNDANCY SCHEME

BACKGROUND

Technical Field

The described aspects relate generally to wireless communication systems, and more particularly, to apparatuses and methods for reducing download control information (DCI) for retransmission scheduling in multi-incremental redundancy scheme (MIRS).

Introduction

Wireless communication systems are widely deployed to provide various telecommunication services such as telephony, video, data, messaging, and broadcasts. Conventional wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G NR. 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology.

In particular, wireless communication systems may implement link adaptation schemes that rely on multiple transmissions. Improvements are presented herein. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods, apparatuses, and computer-readable mediums for wireless communication are disclosed by the present disclosure.

An example aspect includes a method of scheduling transmissions of transport blocks (TBs) at a base station of a wireless communication network, comprising accessing static transmission information indicating configuration information of TB transmissions. The method further includes transmitting, to a user equipment (UE), first downlink control information (DCI) corresponding to a first transmission. The first DCI comprises initial transmission information of the first transmission and dynamic retransmission information of the first transmission. Additionally, the method includes transmitting, to the UE according to the static transmission information and the first DCI, the first transmission comprising at least a first portion of encoded bits of one or more code blocks comprising the TB. Additionally, the method includes receiving, from the UE, an indication of at least one code block that failed to be successfully decoded. Additionally, the method includes transmitting, to the UE, second DCI corresponding to a second transmission. The second DCI comprises dynamic retransmission information of the second transmission. Additionally, the method includes retransmitting, to the UE according to the static transmission information, the first DCI, and the second DCI, the second transmission comprising a second portion of encoded bits of the at least one code block that failed to be successfully decoded.

Another example aspect includes an apparatus of scheduling transmissions of TBs at a base station of a wireless communication network, comprising a memory storing instructions and a processor communicatively coupled with the memory. The processor is configured to execute the instructions to access static transmission information indicating configuration information of TB transmissions. The processor is further configured to execute the instructions to transmit, to a UE, a first DCI corresponding to a first transmission. The first DCI comprises initial transmission information of the first transmission and dynamic retransmission information of the first transmission. Additionally, the processor is further configured to execute the instructions to transmit, to the UE according to the static transmission information and the first DCI, the first transmission comprising at least a first portion of encoded bits of one or more code blocks comprising the TB. Additionally, the processor is further configured to execute the instructions to receive, from the UE, an indication of at least one code block that failed to be successfully decoded. Additionally, the processor is further configured to execute the instructions to transmit, to the UE, second DCI corresponding to a second transmission. The second DCI comprises dynamic retransmission information of the second transmission. Additionally, the processor is further configured to execute the instructions to retransmit, to the UE according to the static transmission information, the first DCI, and the second DCI, the second transmission comprising a second portion of encoded bits of the at least one code block that failed to be successfully decoded.

Another example aspect includes an apparatus of scheduling transmissions of TBs at a base station of a wireless communication network, comprising means for accessing static transmission information indicating configuration information of TB transmissions. The apparatus further includes means for transmitting, to a UE, a first DCI corresponding to a first transmission. The first DCI comprises initial transmission information of the first transmission and dynamic retransmission information of the first transmission. Additionally, the apparatus further includes means for transmitting, to the UE according to the static transmission information and the first DCI, the first transmission comprising at least a first portion of encoded bits of one or more code blocks comprising the TB. Additionally, the apparatus further includes means for receiving, from the UE, an indication of at least one code block that failed to be successfully decoded. Additionally, the apparatus further includes means for transmitting, to the UE, second DCI corresponding to a second transmission. The second DCI comprises dynamic retransmission information of the second transmission. Additionally, the apparatus further includes means for retransmitting, to the UE according to the static transmission information, the first DCI, and the second DCI, the second transmission comprising a second portion of encoded bits of the at least one code block that failed to be successfully decoded.

Another example aspect includes a computer-readable medium (e.g., non-transitory computer-readable medium) storing instructions for scheduling transmissions of TBs at a base station of a wireless communication network, executable by a processor, to access static transmission information indicating configuration information of TB transmissions. The instructions are further executable to transmit, to a UE, a first DCI corresponding to a first transmission. The first DCI comprises initial transmission information of the first transmission and dynamic retransmission information of the first transmission. Additionally, the instructions are further executable to transmit, to the UE according to the static transmission information and the first DCI, the first transmission comprising at least a first portion of encoded bits of one or more code blocks comprising the TB. Additionally, the instructions are further executable to receive, from the UE, an indication of at least one code block that failed to be successfully decoded. Additionally, the instructions are further executable to transmit, to the UE, second DCI corresponding to a second transmission. The second DCI comprises dynamic retransmission information of the second transmission. Additionally, the instructions are further executable to retransmit, to the UE according to the static transmission information, the first DCI, and the second DCI, the second transmission comprising a second portion of encoded bits of the at least one code block that failed to be successfully decoded.

Another example aspect includes a method of scheduling transmissions of TBs at a UE of a wireless communication network, comprising accessing static transmission information indicating configuration information of TB transmissions. The method further includes receiving, from a base station, a first DCI corresponding to a first transmission. The first DCI comprises initial transmission information of the first transmission and dynamic retransmission information of the first transmission. Additionally, the method includes receiving, from the base station according to the static transmission information and the first DCI, the first transmission comprising at least a first portion of encoded bits of one or more code blocks comprising the TB. Additionally, the method includes transmitting, to the base station, an indication of at least one code block that failed to be successfully decoded. Additionally, the method includes receiving, from the base station, second DCI corresponding to a second transmission. The second DCI comprises dynamic retransmission information of the second transmission. Additionally, the method includes receiving, from the base station according to the static transmission information, the first DCI, and the second DCI, the second transmission comprising a second portion of encoded bits of the at least one code block that failed to be successfully decoded.

Another example aspect includes an apparatus of scheduling transmissions of TBs at a UE of a wireless communication network, comprising a memory storing instructions and a processor communicatively coupled with the memory. The processor is configured to execute the instructions to access static transmission information indicating configuration information of TB transmissions. The processor is further configured to execute the instructions to receive, from a base station, a first DCI corresponding to a first transmission. The first DCI comprises initial transmission information of the first transmission and dynamic retransmission information of the first transmission. Additionally, the processor is further configured to execute the instructions to receive, from the base station according to the static transmission information and the first DCI, the first transmission comprising at least a first portion of encoded bits of one or more code blocks comprising the TB. Additionally, the processor is further configured to execute the instructions to transmit, to the base station, an indication of at least one code block that failed to be successfully decoded. Additionally, the processor is further configured to execute the instructions to receive, from the base station, second DCI corresponding to a second transmission. The second DCI comprises dynamic retransmission information of the second transmission. Additionally, the processor is further configured to execute the instructions to receive, from the base station according to the static transmission information, the first DCI, and the second DCI, the second transmission comprising a second portion of encoded bits of the at least one code block that failed to be successfully decoded.

Another example aspect includes an apparatus of scheduling transmissions of TBs at a UE of a wireless communication network, comprising means for accessing static transmission information indicating configuration information of TB transmissions. The apparatus further includes means for receiving, from a base station, a first DCI corresponding to a first transmission. The first DCI comprises initial transmission information of the first transmission and dynamic retransmission information of the first transmission. Additionally, the apparatus further includes means for receiving, from the base station according to the static transmission information and the first DCI, the first transmission comprising at least a first portion of encoded bits of one or more code blocks comprising the TB. Additionally, the apparatus further includes means for transmitting, to the base station, an indication of at least one code block that failed to be successfully decoded. Additionally, the apparatus further includes means for receiving, from the base station, second DCI corresponding to a second transmission. The second DCI comprises dynamic retransmission information of the second transmission. Additionally, the apparatus further includes means for receiving, from the base station according to the static transmission information, the first DCI, and the second DCI, the second transmission comprising a second portion of encoded bits of the at least one code block that failed to be successfully decoded.

Another example aspect includes a computer-readable medium (e.g., non-transitory computer-readable medium) storing instructions for scheduling transmissions of TBs at a UE of a wireless communication network, executable by a processor, to access static transmission information indicating configuration information of TB transmissions. The instructions are further executable to receive, from a base station, a first DCI corresponding to a first transmission. The first DCI comprises initial transmission information of the first transmission and dynamic retransmission information of the first transmission. Additionally, the instructions are further executable to receive, from the base station according to the static transmission information and the first DCI, the first transmission comprising at least a first portion of encoded bits of one or more code blocks comprising the TB. Additionally, the instructions are further executable to transmit, to the base station, an indication of at least one code block that failed to be successfully decoded. Additionally, the instructions are further executable to receive, from the base station, second DCI corresponding to a second transmission. The second DCI comprises dynamic retransmission information of the second transmission. Additionally, the instructions are further executable to receive, from the base station according to the static transmission information, the first DCI, and the second DCI, the second transmission comprising a second portion of encoded bits of the at least one code block that failed to be successfully decoded.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink channels within a subframe, in accordance with various aspects of the present disclosure.

FIG. 4 is a diagram illustrating an example slot allocation of a multi-incremental redundancy scheme (MIRS), in accordance with various aspects of the present disclosure.

FIG. 5 is a diagram illustrating multiple example categorizations of transmission scheduling information, in accordance with various aspects of the present disclosure.

DETAILED DESCRIPTION

Figure 1:
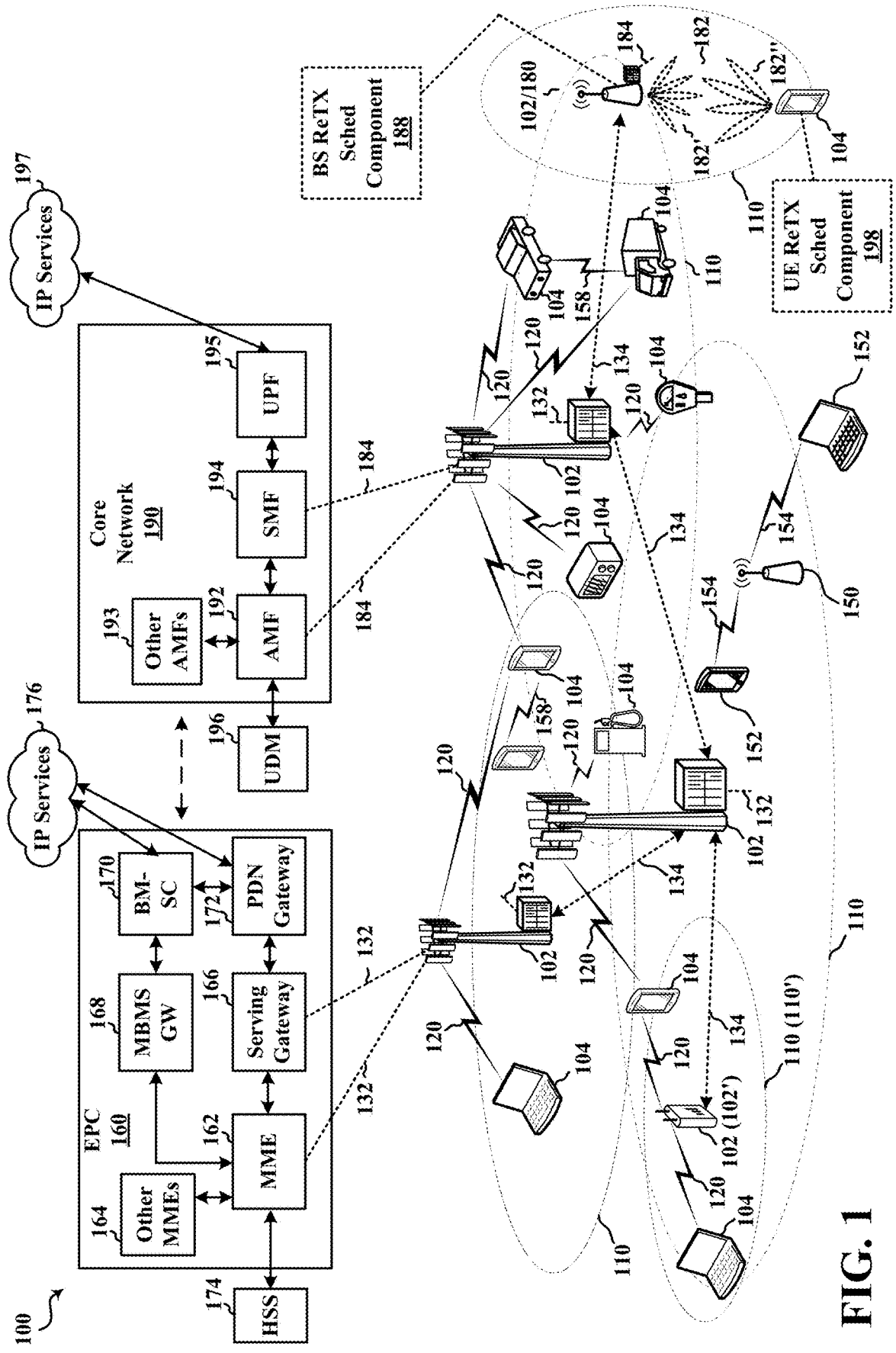
FIG. 1 is a diagram illustrating an example of a wireless communications system and an access network, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Conventional wireless communication systems may implement one or more link adaptation schemes to adapt channel configurations based on changing channel conditions in order to achieve and/or maintain certain performance goals. In some aspects, a link adaptation scheme, such as a multi-incremental redundancy scheme (MIRS), may rely on transmitting transport blocks (TBs) over multiple transmissions (e.g., retransmissions) in order to adapt to a coding rate that may achieve higher throughput rates when compared to conventional link adaptation schemes. As such, resource (e.g., slot) allocations under a MIRS-based link adaptation scheme may comprise portions of one or more TBs. However, in some aspects, conventional wireless communication systems may be configured to allocate a slot to only one transport block. Furthermore, conventional wireless communication systems may be configured to use a same signaling overhead (e.g., download control information (DCI)) for scheduling an initial (e.g., first) transmissions of transport blocks, as well as, retransmissions of the transport blocks.

Aspects presented herein provide for multiple manners for scheduling transmissions of transport blocks. In some aspects, a size of the signaling overhead used to schedule the transmissions may be reduced when compared to a size of the signaling overhead used by a conventional wireless communication system. Further, aspects presented herein may improve throughput of wireless communication devices, when compared to a conventional communication system.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communication system and an access network 100. The wireless communication system 100 (also referred to as a wireless wide area network (WWAN)) includes base stations 102, UEs 104, an Evolved Packet Core (EPC) 160, and another core network 190 (e.g., a 5G Core (5GC)).

In some aspects, the base station 102 may include a base station (BS) retransmission scheduling component 188. The BS retransmission scheduling component 188 may be configured to schedule transmissions of transport blocks (TBs). For example, the BS retransmission scheduling component 188 may access static transmission information, transmit first downlink control information (DCI), transmit a first transmission, receive an indication of at least one code block that failed to be successfully decoded, transmit second DCI, and retransmit a second transmission.

Similarly, the UE 104 may include a UE retransmission scheduling component 198. The UE retransmission scheduling component 198 may be configured to receive scheduled transmissions of TBs. For example, the UE retransmission scheduling component 198 may access static transmission information, receive a first DCI, receive a first transmission, transmit an indication of at least one code block that failed to be successfully decoded, receive second DCI, and receive a second transmission.

The base stations 102 may include macrocells (high power cellular base station) and/or small cells (low power cellular base station). The macrocells include base stations. The small cells include femtocells, picocells, and microcells. The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102 and/or UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to downlink and uplink (e.g., more or fewer carriers may be allocated for downlink than for uplink). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communication system 100 may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152 and/or the AP 150 may perform a clear channel assessment (CCA) prior to communicating in order to determine whether the channel is available.

A base station 102, whether a small cell 102' or a large cell (e.g., macro base station), may include an evolved Node B (eNB), gNodeB (gNB), or other type of base station. Some base stations, such as gNB 180 may operate in one or more frequency bands within the electromagnetic spectrum.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (186 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180 and/or the UE 104 may perform beam training to determine the best receive and transmit directions for each of the base station 180 and/or the UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 to communicate with another UE 104, such as based on sidelink, V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet Protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet-switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may provide examples for communication in connection with 5G NR, the concepts described herein may be applicable to other similar areas, such as LTE, LTE-A, CDMA, GSM, and other wireless technologies.

Referring to FIGS. 2A-2D, the diagrams illustrate examples of different resources that may be used for communications between network elements (e.g., base station 102, UE 104) of the wireless communication system and the access network 100 described above in FIG. 1. The resources may be time-based, frequency-based, or both on time and frequency.

FIG. 2A is a diagram 200 illustrating an example of a first subframe within a 5G NR frame structure. FIG. 2B is a diagram 230 illustrating an example of downlink channels within a 5G NR subframe. FIG. 2C is a diagram 250 illustrating an example of a second subframe within a 5G NR frame structure. FIG. 2D is a diagram 280 illustrating an example of uplink channels within a 5G NR subframe. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A, 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 1 (with mostly uplink). While subframes 3, 4 are shown with slot formats 1, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through DCI, or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (e.g., 10 milliseconds) may be divided into 10 equally sized subframes (e.g., 1 millisecond). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) OFDM (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2 slots/subframe. The subcarrier spacing and symbol length/duration are a function of the numerology. The subcarrier spacing may be equal to $2^{\mu}*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. In such an example, the slot duration may be 0.25 milliseconds, the subcarrier spacing may be 60 kHz, and the symbol duration may be approximately 16.67 microseconds (s). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various downlink channels within a subframe of a frame. The physical downlink control channel (PDCCH) carries DCI within one or more control channel elements (CCEs) (e.g., 1, 2, 4, 8, 16, or 32 CCEs), each CCE including nine RE groups (REGs), each REG including four consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The terms SSB and SS/PBCH may be used interchangeably. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
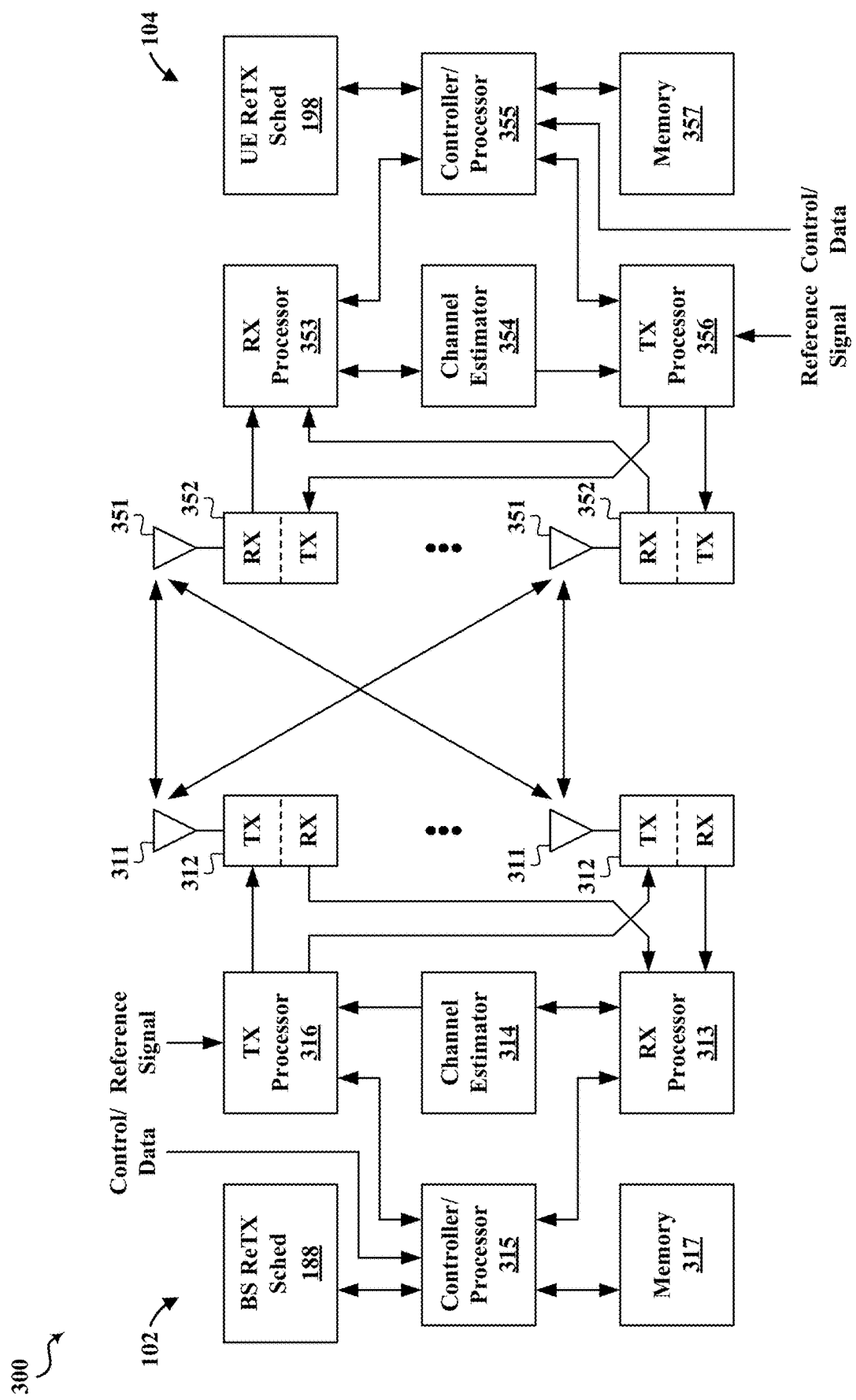
FIG. 3 is a diagram illustrating an example of hardware components of the base station and the UE in the access network, in accordance with various aspects of the present disclosure.

FIG. 3 is a block diagram 300 of example hardware components of a base station 102 in communication with a UE 104 in an access network. In the downlink, IP packets from the EPC 160 may be provided to a controller/processor 315. The controller/processor 315 may implement Layer 3 and/or Layer 2 functionality. Layer 3 may include a radio resource control (RRC) layer, and Layer 2 may include a service data adaptation protocol (SDAP) layer, a packet data convergence protocol (PDCP) layer, a radio link control (RLC) layer, and a medium access control (MAC) layer. The controller/processor 315 may provide RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 313 may implement Layer 1 functionality associated with various signal processing functions. Layer 1, which may include a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 may handle mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream may be spatially precoded to produce multiple spatial streams. Channel estimates from a channel estimator 314 may be used to determine the coding and modulation scheme, as well as for spatial processing. The channel estimate may be derived from a reference signal and/or channel condition feedback transmitted by the UE 104. Each spatial stream may then be provided to a different antenna 311 via a separate transmitter 312TX. Each transmitter 312TX may modulate an RF carrier with a respective spatial stream for transmission.

At the UE 104, each receiver 352RX may receive a signal through its respective antenna 351. Each receiver 352RX may recover information modulated onto an RF carrier and may provide the information to the receive (RX) processor 353. The TX processor 356 and the RX processor 353 may implement Layer 1 functionality associated with various signal processing functions. The RX processor 353 may perform spatial processing on the information to recover any spatial streams destined for the UE 104. If or when multiple spatial streams are destined for the UE 104, the multiple spatial streams may be combined by the RX processor 353 into a single OFDM symbol stream. The RX processor 353 may then convert the OFDM symbol stream from the time-domain to the frequency domain using a Fast Fourier Transform (FFT). The frequency domain signal may comprises a separate OFDM symbol stream for each subcarrier of the OFDM signal. The symbols on each subcarrier, and the reference signal, may be recovered and demodulated by determining the most likely signal constellation points transmitted by base station 102. These soft decisions may be based on channel estimates computed by the channel estimator 354. The soft decisions may then be decoded and deinterleaved to recover the data and control signals that were originally transmitted by the base station 102 on the physical channel. The data and control signals may then be provided to the controller/processor 355, which may implement Layer 3 and Layer 2 functionality.

The controller/processor 355 can be associated with a memory 357 that stores program codes and data. The memory 357 may be referred to as a non-transitory computer-readable medium. The controller/processor 355 may provide demultiplexing between transport and logical channels, packet reassembly, deciphering, header decompression, and control signal processing to recover IP packets from the EPC 160. The controller/processor 355 is also responsible for error detection using an acknowledge (ACK) and/or negative acknowledge (NACK) protocol to support HARQ operations.

Similar to the functionality described in connection with the transmission by base station 102, the controller/processor 355 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 354 from a reference signal or feedback transmitted by the base station 102 may be used by the TX processor 356 to select the appropriate coding and modulation schemes, and to facilitate spatial processing. The spatial streams generated by the TX processor 356 may be provided to different antenna 351 via separate transmitters 352TX. Each transmitter 352TX may modulate an RF carrier with a respective spatial stream for transmission.

The uplink transmission may be processed at the base station 102 in a manner similar to that described in connection with the receiver function at the UE 104. Each receiver 312RX may receive a signal through its respective antenna 311. Each receiver 312RX may recover information modulated onto an RF carrier and may provide the information to a RX processor 313.

The controller/processor 315 may be associated with, and coupled with, a memory 317 that stores program codes and data. The memory 317 may be referred to as a non-transitory computer-readable medium. The controller/processor 315 may provide demultiplexing between transport and logical channels, packet reassembly, deciphering, header decompression, control signal processing to recover IP packets from the UE 104. IP packets from the controller/processor 315 may be provided to the EPC 160. The controller/processor 315 may also be responsible for error detection using an ACK and/or NACK protocol to support HARQ operations.

In some aspects, the base station 102 may include a BS retransmission scheduling component 188. The BS retransmission scheduling component 188 may be configured to schedule transmissions of TBs. For example, the BS retransmission scheduling component 188 may access static transmission information, transmit a first DCI, transmit a first transmission, receive an indication of at least one code block that failed to be successfully decoded, transmit second DCI, and retransmit a second transmission.

In other aspects, at least one of the TX processor 316, the RX processor 313, and the controller/processor 315 may be configured to perform aspects in connection with the BS retransmission scheduling component 188 of FIG. 1. For example, the memory 317 may store computer-executable instructions defining the BS retransmission scheduling component 188. In other aspects, the TX processor 316, the RX processor 313, and/or the controller/processor 315 may be configured to execute the BS retransmission scheduling component 188.

In some aspects, the UE 104 may include a UE retransmission scheduling component 198. The UE retransmission scheduling component 198 may be configured to receive scheduled transmissions of TBs. For example, the UE retransmission scheduling component 198 may access static transmission information, receive a first DCI, receive a first transmission, transmit an indication of at least one code block that failed to be successfully decoded, receive second DCI, and receive a second transmission.

In other aspects, at least one of the TX processor 356, the RX processor 353, and the controller/processor 355 may be configured to perform aspects in connection with the UE retransmission scheduling component 198 of FIG. 1. For example, the memory 357 may store computer-executable instructions defining the UE retransmission scheduling component 198. In other aspects, the TX processor 356, the RX processor 353, and/or the controller/processor 355 may be configured to execute the UE retransmission scheduling component 198.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with enhanced mobile broadband (eMBB), massive machine type communications (mMTC), and ultra-reliable low latency communications (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

MIRS is a rate adaptation scheme for NR-based wireless communication systems that attempts to achieve higher throughput rate than conventional link adaptation schemes based on channel state information-reference signals (CSI-RS) by relying on transmitting transport blocks (TBs) over multiple transmissions. The MIRS-based link adaptation scheme may rely on small-sized retransmissions (e.g., incremental redundancy hybrid automatic repeat request (IR-HARQ) operations) for fine and/or dynamic adaptations to the selected coding rate (e.g., modulation and coding scheme (MCS)) based on feedback from the receiving device (e.g., ACK/NACK) regarding the results of the TB decoding.

Alternatively or additionally, the feedback may indicate whether a code block (CB) and/or a code block group (CBG) was not successfully decoded, and the retransmission may comprise only the code blocks and/or code block groups that were not successfully decoded. That is, a transport block may be segmented into multiple code blocks, wherein each code block may comprise a corresponding error detection code value (e.g., cyclic redundancy check (CRC)). Alternatively or additionally, the code blocks may be grouped into a number of code block groups (e.g., eight) for the transport block.

As a result, under MIRS-based link adaptation schemes, different portions from multiple TBs may be scheduled (e.g., allocated) for transmission (or retransmission) on a single allocation (e.g., slot). For example, as shown in FIG. 4, a slot allocation 400 for a MIRS-based link adaptation scheme may comprise portions from multiple (e.g., six) TBs. The slot allocation 400 may comprise a sixth transmission (or fifth retransmission) TX5 of a first transport block TB0. The TB0/TX5 transmission may comprise code block groups CBG0, CBG2, CBG3, CGB4, CBG5, and CBG7 of the first transport block TB0. The slot allocation 400 may also comprise a fifth transmission (or fourth retransmission) TX4 of a second transport block TB1. The TB1/TX4 transmission may comprise code block groups CBG1, CBG3, CBG4, CGB6, and CBG7 of the second transport block TB1. The slot allocation 400 may also comprise a fourth transmission (or third retransmission) TX3 of a third transport block TB2. The TB2/TX3 transmission may comprise code block groups CBG2, CBG3, CBG4, and CGB5 of the third transport block TB2. The slot allocation 400 may also comprise a third transmission (or second retransmission) TX2 of a fourth transport block TB3. The TB3/TX2 transmission may comprise code block groups CBG4, CBG5, CBG6, and CBG7 of the fourth transport block TB3. The slot allocation 400 may also comprise a second transmission (or first retransmission) TX1 of a fifth transport block TB4. The TB4/TX1 transmission may comprise code block groups CBG1, CBG3, CBG4, and CBG7 of the fifth transport block TB4. The slot allocation 400 may also comprise a first transmission TX0 of a sixth transport block TB5. The TB5/TX0 transmission may comprise code block groups CBG0, CBG1, and CBG2 of the sixth transport block TB5.

It may be understood that the exemplary slot allocation 400 illustrated in FIG. 4 is only one example of a slot allocation that may be utilized without departing from the scope described herein. For example, other allocations may incorporate different quantities of transport block allocations or other code block groups.

In some aspects, conventional wireless communication systems (e.g., using link adaptation schemes based on CSI-RS and/or outer loop link adaptation (OLLA)) may target a low rate of first transmission failures (e.g., 10%). Thus, scheduling of retransmissions may not be particularly optimized and, as such, may use a same and/or comparably-sized DCI for retransmissions as a DCI used for the first transmission. In addition, these conventional wireless communication systems may be configured to schedule only one TB per allocation (e.g., slot).

As a result, throughput gains that may be achieved by the use of retransmissions in a MIRS-based link adaptation scheme may be significantly reduced by the signaling overhead associated with the retransmissions. Thus, reducing the signaling overhead associated with retransmissions may be desirable.

Aspects presented herein provide for multiple manners for scheduling transmissions of transport blocks under a MIRS-based link adaptation scheme. In some aspects, a size of the signaling overhead used to schedule the transmissions may be reduced when compared to a size of the signaling overhead used by a conventional wireless communication system. Further, aspects presented herein may improve throughput of wireless communication devices, when compared to a conventional communication system.

In some aspects, the transmission scheduling information may be categorized into three categories, namely, static transmission information, initial transmission information, and dynamic retransmission information.

The static transmission information may generally refer to transmission scheduling information that may be constant (e.g., fixed) and/or predetermined prior to starting the link adaptation procedure. For example, the static transmission information may be stored and/or accessed by the transmitting device (e.g., base station 102) and the receiving device (e.g., UE 104), and, as such, may not be transmitted (e.g., signaled) during the link adaptation procedure. That is, the static transmission information may be stored in a memory device of the base station 102 (e.g., memory 317 of FIG. 3) and a memory device of the UE 104 (e.g., memory 357 of FIG. 3) and read by the corresponding entity. Alternatively or additionally, the static transmission information may be stored in a network accessible by the base station 102 and the UE 104. In some aspects, the base station 102 may obtain updated static transmission information and may transmit the updated static transmission information to the UE 104 (e.g., via radio resource control (RRC) signaling).

The initial transmission information may generally refer to transmission scheduling information that may only be included in the scheduling information corresponding to a first (e.g., initial) transmission of a transport block. For example, the base station 102 may be configured to transmit, to the UE 104, the initial transmission information using first downlink control information (DCI) that corresponds to the first transmission of the transport block. In such an example, the UE 104 may be configured to store the initial transmission information for decoding the transmission and subsequent retransmissions of the transport block.

The dynamic retransmission information may generally refer to transmission scheduling information that may be included in the scheduling information corresponding to each transmission and retransmission of the transport block. The dynamic retransmission information may comprise a minimum reduced amount of information (e.g., bits) so as to reduce signaling overhead associated with the transmission and retransmission of the transport block. For example, the dynamic retransmission information may comprise a transport block identifier (e.g., a HARQ process number) and a transmission identifier.

In some aspects, the static transmission information may comprise a single set of scheduling configuration information that may be indexed by initial modulation and coding scheme (MCS) and transmission number, the initial transmission information may indicate the initial MCS, and the dynamic retransmission information may comprise a transmission number.

In other optional or additional aspects, the static transmission information may comprise several preconfigured sets of scheduling configuration information. Set selection may be performed during scheduling of the first transmission of the transport block (e.g., DCI-based) and/or may be based on application layer signaling (e.g., RRC-based). In such optional or additional aspects, the initial transmission information may indicate the initial MCS, and the dynamic retransmission information may comprise the transmission number.

In other optional or additional aspects, the initial transmission information may comprise one or more additional values that may override and/or complement the scheduling configuration information from the static transmission information. As such, the static transmission information may be modified for transmissions of the transport block.

In other optional or additional aspects, the dynamic retransmission information may comprise other additional values that may override and/or complement the scheduling configuration information from the static transmission information and/or the initial transmission information. As such, the static transmission information and the initial transmission information may be modified for a particular set of transmissions of the transport block.

In some aspects, the transmission scheduling information may comprise at least one of an initial MCS, a maximum number of retransmissions, HARQ parameters (e.g., a HARQ process number). In other optional or additional aspects, the transmission scheduling information may comprise, for each transmission of a transport block, at least one of an indication of the modulation scheme, a partial allocation size, start location of the transmission in a buffer (e.g., RV index). Alternatively or additionally, if or when feedback per code block group or per code block is configured, the transmission scheduling information may comprise an indication (e.g., bitmap) of the code block groups and/or code blocks included in the corresponding transmission.

The transmission scheduling information parameters and values described above may be categorized as static transmission information, initial transmission information, and/or dynamic retransmission information as needed. That is, transmission scheduling information parameters and values may be categorized according to a tradeoff between DCI size and flexibility.

For example, referring to FIG. 5, diagram 500 illustrates four example categorizations of transmission scheduling information. In some aspects, the base station 102 (e.g., transmitting device) may select between one or more of these example categorizations for each transport block that is to be transmitted. The base station 102 may be configured to indicate to the UE 104 (e.g., receiving device) the selected categorization with the first transport block transmission (e.g., DCI-based) and/or using application layer signaling (e.g., RRC-based).

In some aspects, a first option 502A may include static transmission information that comprises a single set of coding parameters and allocated partial sizes. The first option 502A may include initial transmission information that comprises an initial MCS. The first option 502A may include dynamic retransmission information that comprises a TB identifier (e.g., HARQ process identification), a transmission number, and/or a CBG/CB bitmap indicating code block groups or code blocks comprised by the transmission.

In some aspects, a second option 502B may include static transmission information that comprises multiple sets of coding parameters and allocated partial sizes. The second option 502B may include initial transmission information that comprises an initial MCS and a set selection indication. The second option 502B may include dynamic retransmission information that comprises a TB identifier (e.g., HARQ process identification), a transmission number, and/or a CBG/CB bitmap indicating code block groups or code blocks comprised by the transmission.

In some aspects, a third option 502C may include static transmission information that comprises multiple sets of coding parameters and allocated partial sizes. The third option 502C may include initial transmission information that comprises an initial MCS, a set selection indication, and one or more additional and/or overriding values. The third option 502C may include dynamic retransmission information that comprises a TB identifier (e.g., HARQ process identification), a transmission number, and/or a CBG/CB bitmap indicating code block groups or code blocks comprised by the transmission.

In some aspects, a fourth option 502D may include static transmission information that comprises multiple sets of coding parameters and allocated partial sizes. The fourth option 502D may include initial transmission information that comprises an initial MCS, a set selection indication, and one or more additional and/or overriding values. The fourth option 502D may include dynamic retransmission information that comprises a TB identifier (e.g., HARQ process identification), a transmission number, a CBG/CB bitmap indicating code block groups or code blocks comprised by the transmission, and/or one or more additional and/or overriding values.

It may be understood that the optional categorizations illustrated in FIG. 5 are only four examples of transmission scheduling information categorization that may be utilized without departing from the scope described herein. For example, other categorizations may incorporate different arrangements of transmission scheduling information parameters and values.

Figure 6:
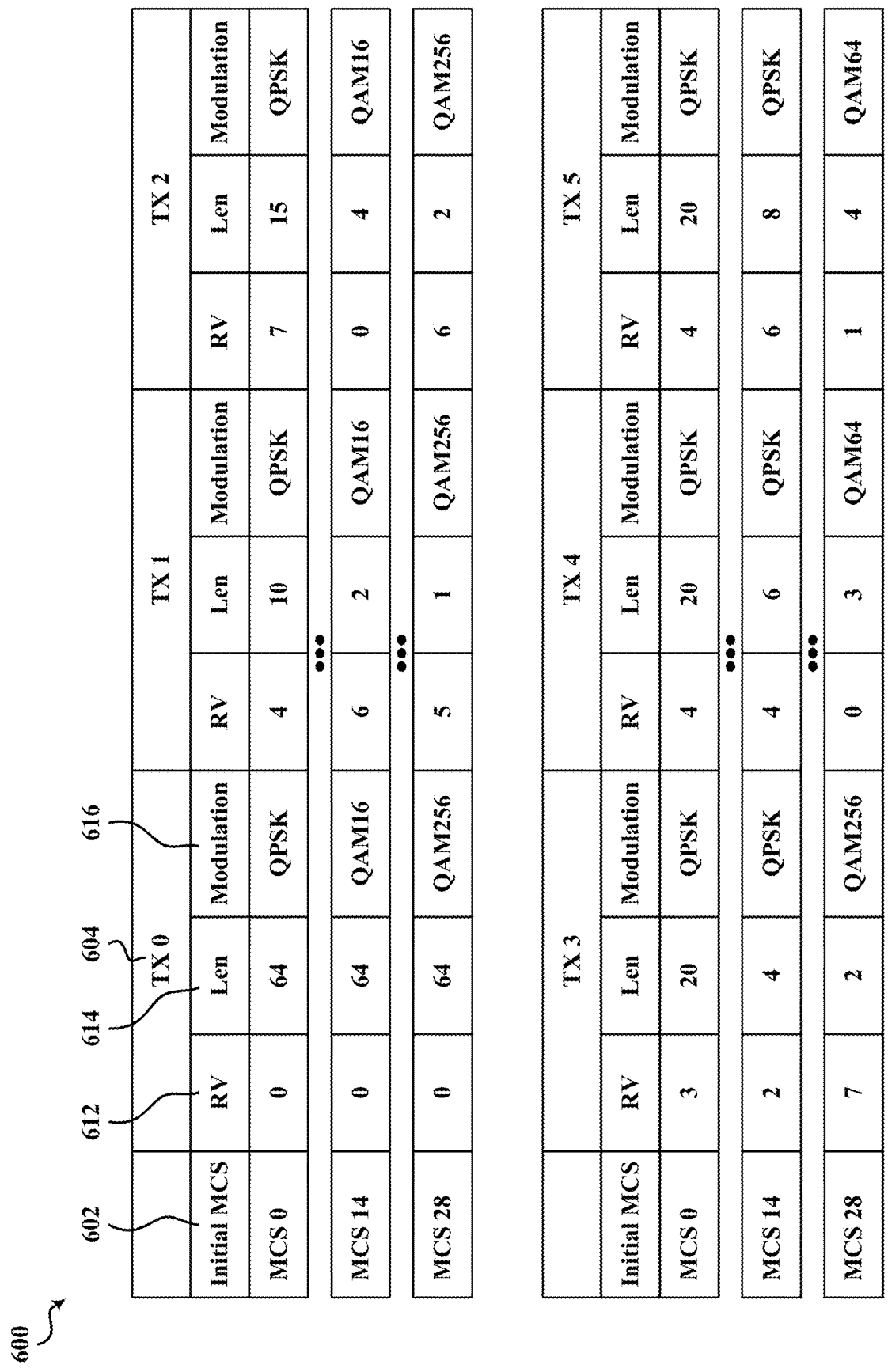
FIG. 6 is a diagram illustrating an example of static transmission information, in accordance with various aspects of the present disclosure.

FIG. 6 illustrates an example of a single set of static transmission information 600. The static transmission information 600 may be configured for a particular maximum number of transmissions TX0-TX5 (e.g., six). The static transmission information 600 may comprise a two-dimensional table of scheduling configuration information that may be indexed by initial MCS 602 (e.g., MCS 0-MCS 28) and transmission number 604 (e.g., TX 0, TX 1, TX 2, TX 3, TX 4, TX 5). The scheduling configuration information (e.g., 612-616) may comprise parameters for configuring each transmission of the transport block. For example, the scheduling configuration information may comprise a start location of the transmission in a buffer (e.g., RV index 612), a partial allocation size (e.g., length 614), and an indication of the modulation scheme for the transmission (e.g., modulation 616). In some aspects, the RV index 612 may be an index value representing a predefined (e.g., fixed) location in the buffer. Alternatively or additionally, the length 614 may correspond to a number of 1/64 fractions of the total allocation size. That is, a length of 64 may correspond to the total allocation size, and a length of 1 may correspond to 1/64 of the total allocation size. The modulation 616 may indicate a modulation scheme for the transmission. That is, the base station 102 may configure a transmission with the modulation scheme indicated by the corresponding transmission number and initial MCS. In some aspects, the modulation schemes assigned to later transmissions may produce a lower coding rate than the modulation schemes assigned to the initial and/or earlier transmissions.

In some aspects, the base station 102 may be configured to access the scheduling configuration information from the static transmission information 600 that corresponds to the initial MCS configured for the transport block and the transmission number.

In other aspects, the base station 102 may be configured to transmit the first DCI comprising an indication of the initial MCS configured for the transport block. The first DCI may omit comprising a transmission number (e.g., TX 0), as the transmission number may be implicitly indicated by the first DCI.

Alternatively or additionally, the base station 102 may be configured to retransmit additional transmissions of the transport block, as indicated by acknowledgement feedback (e.g., ACK/NACK) received from the UE 104. That is, if or when the UE 104 indicates that a portion of the transport block was not successfully decoded, the base station 102 may retransmit the indicated portion to the UE 104. Alternatively or additionally, if or when the UE 104 indicates that another portion of the transport block was successfully decoded, the base station 102 may refrain from retransmitting the another portion of the transport block that was successfully decoded. Each retransmission of at least a portion of the transport block may be scheduled by transmitting a corresponding DCI that may comprise a transport block identifier (e.g., HARQ process number), a transmission number (e.g., 1-5), and/or a CBG/CB bitmap indicating the CBG and/or CBs included in the transmission if or when feedback per code block group or per code block is configured.

In some aspects, the dynamic retransmission information may comprise a transport block identifier (e.g., HARQ process identification) for each of the one or more transport blocks included in the corresponding slot allocation. Each transport block identifier may comprise a common prefix and a unique suffix. The common prefix may identify a HARQ process associated with the one or more transport blocks included in the corresponding slot allocation, and, as such, may only be indicated once in the dynamic retransmission information. Thus, a size of the dynamic retransmission information may be further reduced. The unique suffix may identify the corresponding transport block within the HARQ process associated with the particular transport block.

In other optional or additional aspects, the feedback indication received from the UE 104 indicating whether the transmitted transport block was decoded successfully may further comprise an error detection code (e.g., CRC) corresponding to the indication. In response to receiving the error detection code, the base station 102 may validate that the indication was received and decoded correctly. If or when the validation determines that the indication was received and decoded successfully, the base station 102 may omit one or more parameters from the dynamic retransmission information corresponding to a subsequent retransmission of the particular transport block.

For example, the base station 102 may omit, from the dynamic retransmission information, the transport block identifiers of the transport blocks included in the retransmission. That is, the base station 102 may include the transport blocks sorted in a predetermined order (e.g., ascending, descending) according to the transmission number of the respective transport blocks.

In another example, the base station 102 may omit, from the dynamic retransmission information, the transmission number for each transport block in the transmission. That is, the UE 104 may derive the transmission number by increasing a counter for each failed transmission. Alternatively or additionally, the base station 102 may transmit another DCI indicating a transmission number for the transport block and may cause the UE 104 to reset the derived transmission number to the transmission number indicated by the new DCI.

In another example, the base station 102 may omit, from the dynamic retransmission information, the CBG/CB bitmap for each transport block in the transmission. As both the base station 102 (e.g., transmitting device) and the UE 104 (e.g., receiving device) have the indication of the CBGs and/or CBs that failed to be decoded successfully in the previous transmission, the CBG/CB bitmap indicating the CBGs and/or CBs included in the subsequent transmission may be omitted. That is, the UE 104 may derive the CBGs and/or CBs included in the subsequent transmission based on the CBGs and/or CBs that failed to be decoded successfully in the previous transmission.

Thus, aspects presented herein may reduce a size of the signaling overhead associated with transmissions and retransmissions of transport blocks, when compared to a size of the signaling overhead used by a conventional wireless communication system. Further, aspects presented herein may improve throughput of wireless communication devices, when compared to a conventional communication system.

Figure 7:
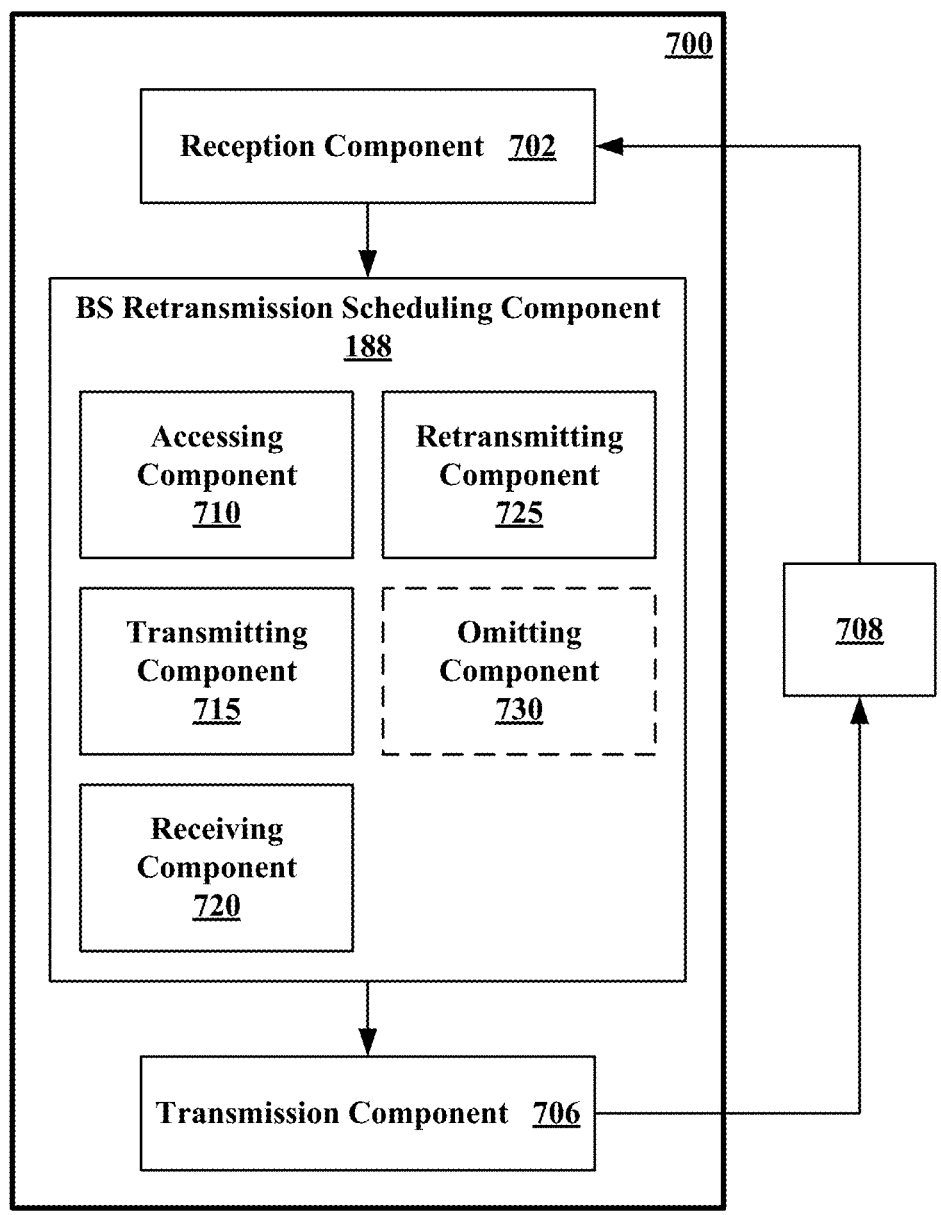
FIG. 7 is a diagram illustrating an example apparatus, such as a base station, for scheduling transmissions of transport blocks (TBs), in accordance with various aspects of the present disclosure.

FIG. 7 is a block diagram of an example apparatus 700 for wireless communication. The apparatus 700 may be a base station 102 (e.g., base station 102 of FIGS. 1 and 3) or a base station 102 may include the apparatus 700. In some aspects, the apparatus 700 may include a reception component 702 configured to receive wireless communications from another apparatus (e.g., apparatus 708), a BS retransmission scheduling component 188 configured to schedule transmissions of TBs, a transmission component 706 configured to transmit wireless communications to another apparatus (e.g., apparatus 708), and which may be in communication with one another (e.g., via buses or electrical connections). As shown, the apparatus 700 may be in communication with another apparatus 708 (such as a UE 104, or another wireless communication device) using the reception component 702 and the transmission component 706.

In some aspects, the apparatus 700 may be configured to perform one or more operations described herein in connection with FIGS. 1 and 3-6. Alternatively or additionally, the apparatus 700 may be configured to perform one or more processes described herein, such as method 800 of FIGS. 8-9. In some aspects, the apparatus 700 may include one or more components of the UE 104 described above in connection with FIGS. 1 and 3.

The reception component 702 may receive communications, such as reference signals, control information, data communications, or a combination thereof, from the apparatus 708. The reception component 702 may provide received communications to one or more other components of the apparatus 700, such as the BS retransmission scheduling component 188. In some aspects, the reception component 702 may perform signal processing on the received communications (such as filtering, amplification, demodulation, analog-to-digital conversion, demultiplexing, de-interleaving, de-mapping, equalization, interference cancellation, or decoding, among other examples), and may provide the processed signals to the one or more other components. In some aspects, the reception component 702 may include one or more antennas, a demodulator, a MIMO detector, a receive processor, a controller/processor, a memory, or a combination thereof, of the base station 102 described above in connection with FIGS. 1 and 3.

The transmission component 706 may transmit communications, such as reference signals, control information, data communications, or a combination thereof, to the apparatus 708. In some aspects, the BS retransmission scheduling component 188 may generate communications and may transmit the generated communications to the transmission component 706 for transmission to the apparatus 708. In some aspects, the transmission component 706 may perform signal processing on the generated communications (such as filtering, amplification, modulation, digital-to-analog conversion, multiplexing, interleaving, mapping, or encoding, among other examples), and may transmit the processed signals to the apparatus 708. In other aspects, the transmission component 706 may include one or more antennas, a modulator, a transmit MIMO processor, a transmit processor, a controller/processor, a memory, or a combination thereof, of the base station 102 described above in connection with FIGS. 1 and 3. In some aspects, the transmission component 706 may be co-located with the reception component 702 in a transceiver or transceiver component.

The BS retransmission scheduling component 188 may be configured to schedule transmissions of TBs. In some aspects, the BS retransmission scheduling component 188 may include a set of components, such as an accessing component 710 configured to access static transmission information, a transmitting component 715 configured to transmit a first DCI, a first transmission, and second DCI, a receiving component 720 configured to receive an indication of at least one code block that failed to be successfully decoded, and a retransmitting component 725 configured to retransmit a second transmission.

In other optional or additional aspects, the BS retransmission scheduling component 188 may include an omitting component 730 configured to omit information from the dynamic retransmission information.

Alternatively or additionally, the set of components may be separate and distinct from the BS retransmission scheduling component 188. In other aspects, one or more components of the set of components may include or may be implemented within a controller/processor (e.g., the TX processor 316, the RX processor 313, the controller/processor 315), a memory (e.g., the memory 317), or a combination thereof, of the base station 102 described in FIGS. 1 and 3. Alternatively or additionally, one or more components of the set of components may be implemented at least in part as software stored in a memory, such as the memory 317. For example, a component (or a portion of a component) may be implemented as computer-executable instructions or code stored in a computer-readable medium (e.g., a non-transitory computer-readable medium) and executable by a controller or a processor to perform the functions or operations of the component.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIGS. 1 and 3.

Figure 8:
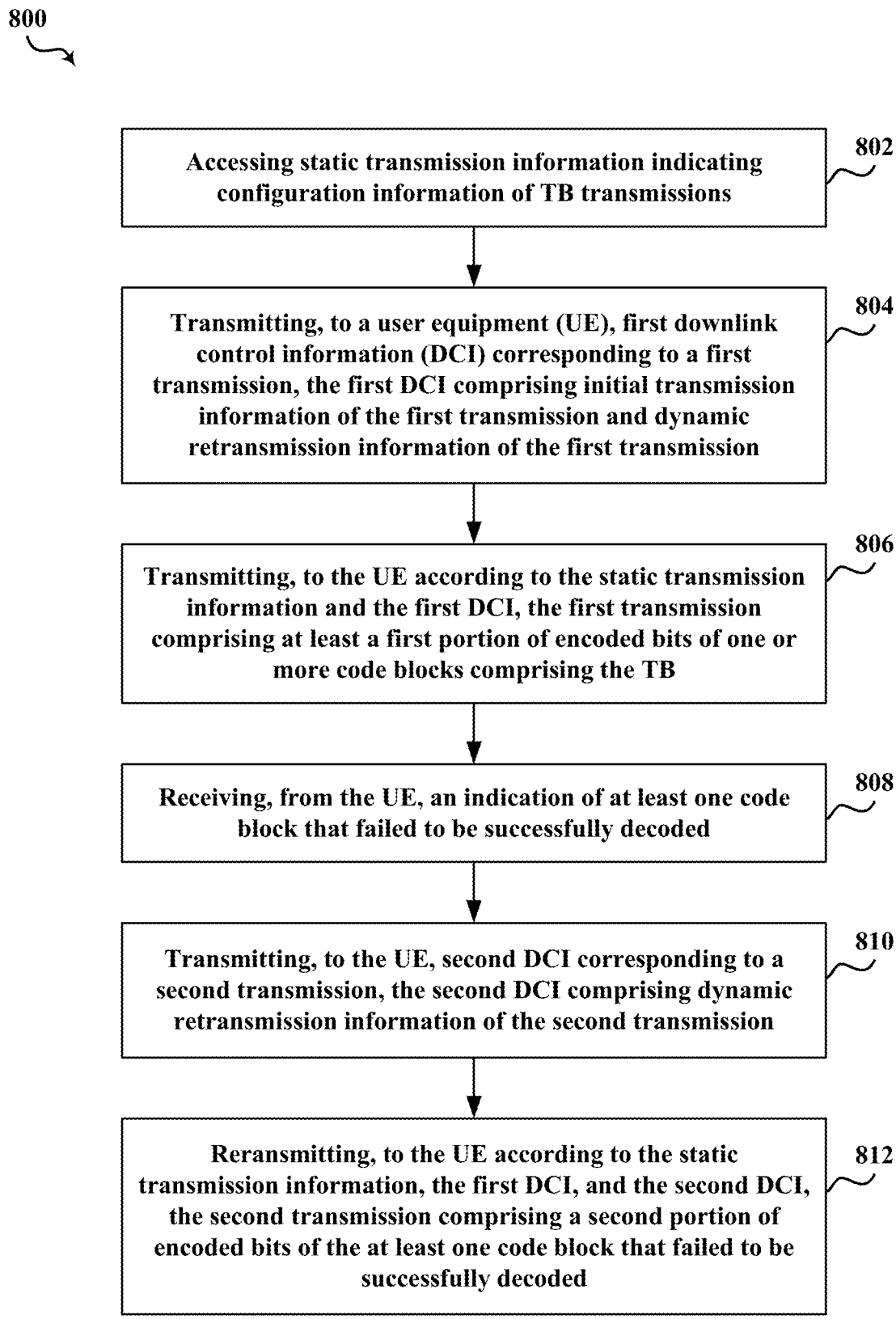
FIG. 8 is a flowchart of a method of scheduling transmissions of TBs at a base station, in accordance with various aspects of the present disclosure.
Figure 9:
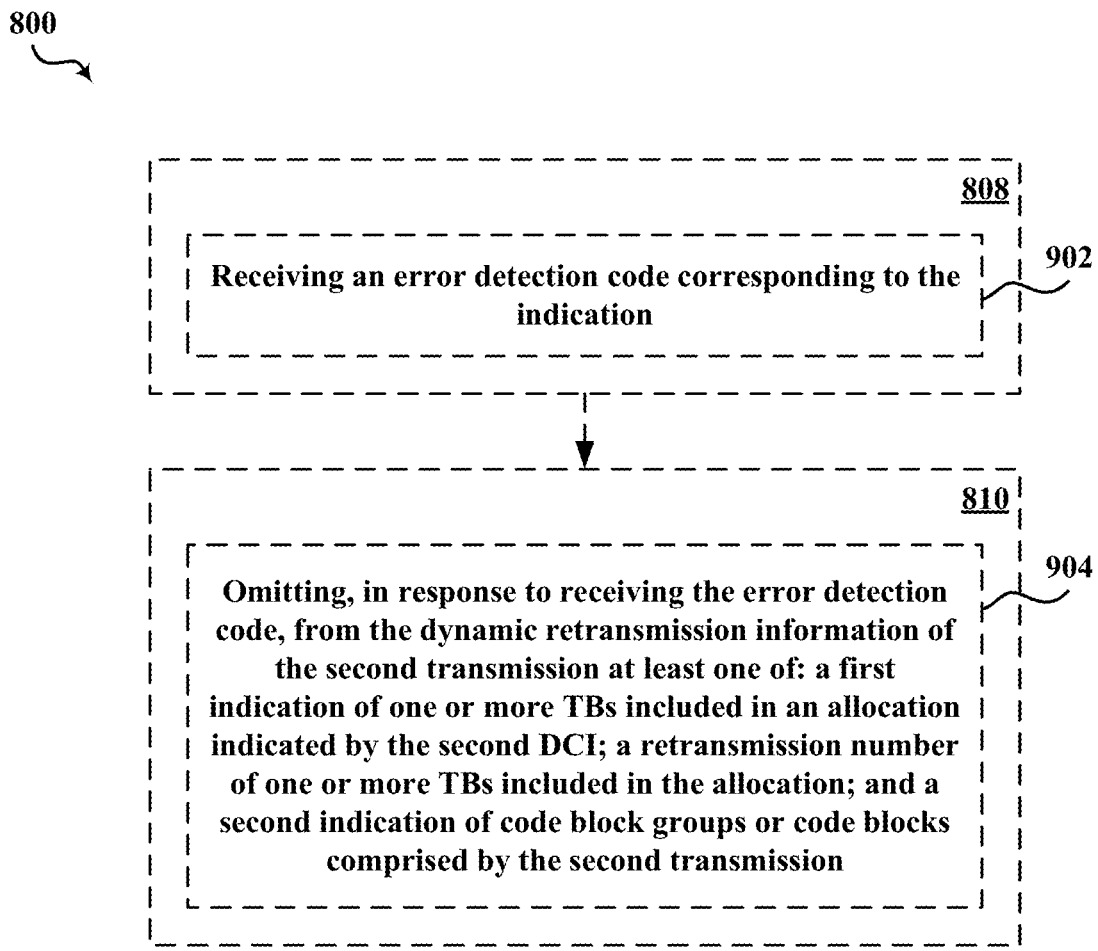
FIG. 9 is a flowchart of additional or optional steps for the method of scheduling transmissions of the TB at the base station, in accordance with various aspects of the present disclosure.

Referring to FIGS. 7-9, in operation, a base station 102 may perform a method 800 of scheduling transmissions of TBs. The method 800 may be performed by the apparatus 700 (which may include the memory 317 and which may be the entire base station 102 and/or one or more components of the base station 102 such as the BS retransmission scheduling component 188, the TX processor 316, the RX processor 313, and/or the controller/processor 315). The method 800 may be performed by the BS retransmission scheduling component 188 in communication with the UE 104.

At block 802 of FIG. 8, the method 800 includes accessing static transmission information indicating configuration information of TB transmissions. For example, in an aspect, the base station 102, the BS retransmission scheduling component 188, and/or the accessing component 710 may be configured to or may comprise means for accessing static transmission information indicating configuration information of TB transmissions.

For example, the accessing at block 802 may include accessing a predetermined transmission information according to an initial MCS to obtain scheduling information corresponding a transmission number, as described above in reference to FIGS. 4-6. For example, the base station 102 may use the scheduling information to configure the first transmission of the transport block and subsequent retransmissions of the transport block.

In some aspects, the accessing at block 802 may include receiving updated predetermined transmission information via RRC signaling and updating the predetermined transmission information with the updated information.

Further, for example, the accessing at block 802 may be performed to access transmission scheduling information that may be constant (e.g., fixed) and/or predetermined prior to starting the link adaptation procedure and/or transmission of one or more transport blocks. Further, the predetermined transmission information may not be transmitted to the UE 104, and, as such, may reduce signaling overhead associated with the transmission and/or retransmission of the transport block.

In other optional or additional aspects, the static transmission information may comprise a set of configuration information that is indexed by initial MCS and transmission number. The set of configuration information may comprise at least one of coding parameters and partial allocation sizes.

In other optional or additional aspects, the static transmission information may comprise a plurality of sets of configuration information that are indexed by initial MCS and transmission number. Each set of the plurality of sets of configuration information may comprise at least one of coding parameters and partial allocation sizes.

At block 804 of FIG. 8, the method 800 includes transmitting, to a user equipment (UE), first downlink control information (DCI) corresponding to a first transmission, the first DCI comprising initial transmission information of the first transmission and dynamic retransmission information of the first transmission. For example, in an aspect, the base station 102, the BS retransmission scheduling component 188, and/or the transmitting component 715 may be configured to or may comprise means for transmitting, to a UE 104, a first DCI corresponding to a first transmission, the first DCI comprising initial transmission information of the first transmission and dynamic retransmission information of the first transmission.

For example, the transmitting at block 804 may include transmitting the first DCI comprising the initial transmission information of the first transmission and the dynamic retransmission information of the first transmission for the transport block, as described above in reference to FIGS. 5 and 6.

In some aspects, the first DCI may further comprise initial transmission information and dynamic retransmission information corresponding to one or more other transport blocks included in the first transmission. That is, a slot allocation of the first transmission may include one or more transport blocks, as described above in reference to FIG. 4.

Further, for example, the transmitting at block 804 may be performed to schedule transmission of the first transmission of the transport block.

In other optional or additional aspects, the initial transmission information may indicate the initial MCS. Alternatively or additionally, the dynamic retransmission information may comprise a transport block identifier, a transmission number, and an indication of a TB comprised by the first transmission or of code block groups or code blocks comprised by the first transmission.

In other optional or additional aspects, the initial transmission information may indicate the initial MCS and a selected set of the plurality of sets of configuration information. Alternatively or additionally, the dynamic retransmission information may comprise a transport block identifier, a transmission number, and an indication of a TB comprised by the first transmission or of code block groups or code blocks comprised by the first transmission.

In other optional or additional aspects, the initial transmission information may indicate the initial MCS and a selected set of the plurality of sets of configuration information, and may comprise one or more additional and/or overriding values corresponding to one or more coding parameters and partial allocation sizes of the selected set of the plurality of sets of configuration information. Alternatively or additionally, the dynamic retransmission information may comprise a transport block identifier, a transmission number, and an indication of a TB comprised by the first transmission or of code block groups or code blocks comprised by the first transmission.

In other optional or additional aspects, the initial transmission information may indicate the initial MCS and a selected set of the plurality of sets of configuration information, and may comprise one or more additional and/or overriding values corresponding to one or more coding parameters and partial allocation sizes of the selected set of the plurality of sets of configuration information. Alternatively or additionally, the dynamic retransmission information may comprise a transport block identifier, a transmission number, an indication of a TB comprised by the first transmission or of code block groups or code blocks comprised by the first transmission, and one or more additional and/or overriding values corresponding to one or more coding parameters and partial allocation sizes of the selected set of the plurality of sets of configuration information.

In other optional or additional aspects, the dynamic retransmission information may comprise a transport block identifier comprising a common prefix identifying a HARQ process associated with one or more transport blocks comprised by one or more transmissions corresponding to the HARQ process, and a unique suffix identifying the transport block within the HARQ process.

At block 806 of FIG. 8, the method 800 includes transmitting, to the UE according to the static transmission information and the first DCI, the first transmission comprising at least a first portion of encoded bits of one or more code blocks comprising the TB. For example, in an aspect, the base station 102, the BS retransmission scheduling component 188, and/or the transmitting component 715 may be configured to or may comprise means for transmitting, to the UE 104 according to the static transmission information and the first DCI, the first transmission comprising at least a first portion of encoded bits of one or more code blocks comprising the TB.

For example, the transmitting at block 806 may include transmitting one or more code blocks and/or code block groups of the transport block as configured by the first DCI.

In some aspects, the first transmission may further comprise one or more code blocks and/or code block groups of one or more other transport blocks. That is, a slot allocation of the first transmission may include one or more transport blocks (e.g., retransmissions of portions of transport blocks that failed to be successfully decoded, initial transmissions of other portions of other transport blocks), as described above in reference to FIG. 4.

Further, for example, the transmitting at block 806 may be performed to start transmitting the transport block to the UE 104.

At block 806 of FIG. 8, the method 800 includes receiving, from the UE, an indication of at least one code block that failed to be successfully decoded. For example, in an aspect, the base station 102, the BS retransmission scheduling component 188, and/or the receiving component 720 may be configured to or may comprise means for receiving, from the UE 104, an indication of at least one code block that failed to be successfully decoded.

For example, the receiving at block 808 may include selecting one or more code blocks and/or code block groups for retransmission in a subsequent transmission based on the indication. For example, if or when the UE 104 indicates that a portion of the transport block was not successfully decoded (e.g., NACK), the base station 102 may select the indicated portion for retransmission to the UE 104. Alternatively or additionally, if or when the UE 104 indicates that another portion of the transport block was successfully decoded (e.g., ACK), the base station 102 may refrain from selecting the another portion of the transport block for retransmission.

Further, for example, the receiving at block 808 may be performed to allow the base station 102 to retransmit a portion of the transport block that failed to be decoded successfully, rather than retransmitting the transport block entirely. As such, signaling overhead may be reduced and/or throughput may be increased, when compared to a conventional wireless communication system.

At block 810 of FIG. 8, the method 800 includes transmitting, to the UE, second DCI corresponding to a second transmission, the second DCI comprising dynamic retransmission information of the second transmission. For example, in an aspect, the base station 102, the BS retransmission scheduling component 188, and/or the transmitting component 715 may be configured to or may comprise means for transmitting, to the UE 104, second DCI corresponding to a second transmission, the second DCI comprising dynamic retransmission information of the second transmission.

For example, the transmitting at block 810 may include transmitting the second DCI comprising the initial transmission information of the second transmission and the dynamic retransmission information of the second transmission for the transport block, as described above in reference to FIGS. 5 and 6.

In some aspects, the second DCI may further comprise initial transmission information and dynamic retransmission information corresponding to one or more other transport blocks included in the second transmission. That is, a slot allocation of the second transmission may include one or more transport blocks (e.g., retransmissions of portions of transport blocks that failed to be successfully decoded, initial transmissions of other portions of other transport blocks), as described above in reference to FIG. 4.

Further, for example, the transmitting at block 810 may be performed to schedule transmission of the second transmission of the transport block.

At block 812 of FIG. 8, the method 800 includes retransmitting, to the UE according to the static transmission information, the first DCI, and the second DCI, the second transmission comprising a second portion of encoded bits of the at least one code block that failed to be successfully decoded. For example, in an aspect, the base station 102, the BS retransmission scheduling component 188, and/or the retransmitting component 725 may be configured to or may comprise means for retransmitting, to the UE 104 according to the static transmission information, the first DCI, and the second DCI, the second transmission comprising a second portion of encoded bits of the at least one code block that failed to be successfully decoded.

For example, the retransmitting at block 812 may include retransmitting one or more code blocks and/or code block groups of the transport block as configured by the second DCI. That is, the retransmitting at block 812 may include retransmitting one or more code blocks and/or code block groups indicated by the UE 104, at block 808, as having failed to be decoded successfully.

In some aspects, the second transmission may further comprise one or more code blocks and/or code block groups of one or more other transport blocks. That is, a slot allocation of the second transmission may include one or more transport blocks, as described above in reference to FIG. 4.

Further, for example, the retransmitting at block 812 may be performed to continue transmitting the transport block to the UE 104.

Referring to FIG. 9, in an optional or additional aspect that may be combined with any other aspect, at block 902, the receiving, at block 808 of method 800, from the UE, of the indication of the at least one code block that failed to be successfully decoded comprises receiving an error detection code corresponding to the indication. For example, in an aspect, the base station 102, the BS retransmission scheduling component 188, and/or the receiving component 720 may be configured to or may comprise means for receiving an error detection code corresponding to the indication.

For example, the receiving at block 902 may include validating the indication, received at block 808, with the error detection code corresponding to the indication. That is, the receiving at block 902 may include validating that the indication was received and decoded correctly.

Further, for example, the receiving at block 902 may be performed to determine whether the indication received from the UE 104 was received and decoded correctly. The determination may allow the base station 102 to omit one or more parameters from a subsequent DCI, and, as such, may reduce signaling overhead associated with the transmission of the transport block.

In this optional or additional aspect, at block 904, the transmitting, at block 810 of method 800, to the UE, of the second DCI corresponding to the second transmission comprises omitting, in response to receiving the error detection code, from the dynamic retransmission information of the second transmission at least one of: a first indication of one or more TBs included in an allocation indicated by the second DCI; a retransmission number of one or more TBs included in the allocation; and a second indication of a TB comprised by the second transmission or of code block groups or code blocks comprised by the second transmission. For example, in an aspect, the base station 102, the BS retransmission scheduling component 188, and/or the omitting component 730 may be configured to or may comprise means for omitting, in response to receiving the error detection code, from the dynamic retransmission information of the second transmission at least one of: a first indication of one or more TBs included in an allocation indicated by the second DCI; a retransmission number of one or more TBs included in the allocation; and a second indication of a TB comprised by the second transmission or of code block groups or code blocks comprised by the second transmission.

For example, the omitting at block 904 may include omitting, from the dynamic retransmission information, the transport block identifiers of the transport blocks included in the retransmission. That is, the base station 102 may include the transport blocks sorted in a predetermined order (e.g., ascending, descending) according to the transmission number of the respective transport blocks.

In some aspects, the omitting at block 904 may include omitting, from the dynamic retransmission information, the transmission number for each transport block in the transmission. That is, the UE 104 may derive the transmission number by increasing a counter for each failed transmission. Alternatively or additionally, the base station 102 may transmit another DCI indicating a transmission number for the transport block and may cause the UE 104 to reset the derived transmission number to the transmission number indicated by the new DCI.

In other optional or additional aspects, the omitting at block 904 may include omitting, from the dynamic retransmission information, the CBG/CB bitmap for each transport block in the transmission. As both the base station 102 (e.g., transmitting device) and the UE 104 (e.g., receiving device) have the indication of the CBGs and/or CBs that failed to be decoded successfully in the previous transmission, the CBG/CB bitmap indicating the CBGs and/or CBs included in the subsequent transmission may be omitted. That is, the UE 104 may derive the CBGs and/or CBs included in the subsequent transmission based on the CBGs and/or CBs that failed to be decoded successfully in the previous transmission.

Further, for example, the omitting at block 904 may be performed to reduce signaling overhead associated with the transmission of the transport block, when compared to a size of the signaling overhead used by a conventional wireless communication system. Further, aspects presented herein may improve throughput of wireless communication devices, when compared to a conventional communication system.

Figure 10:
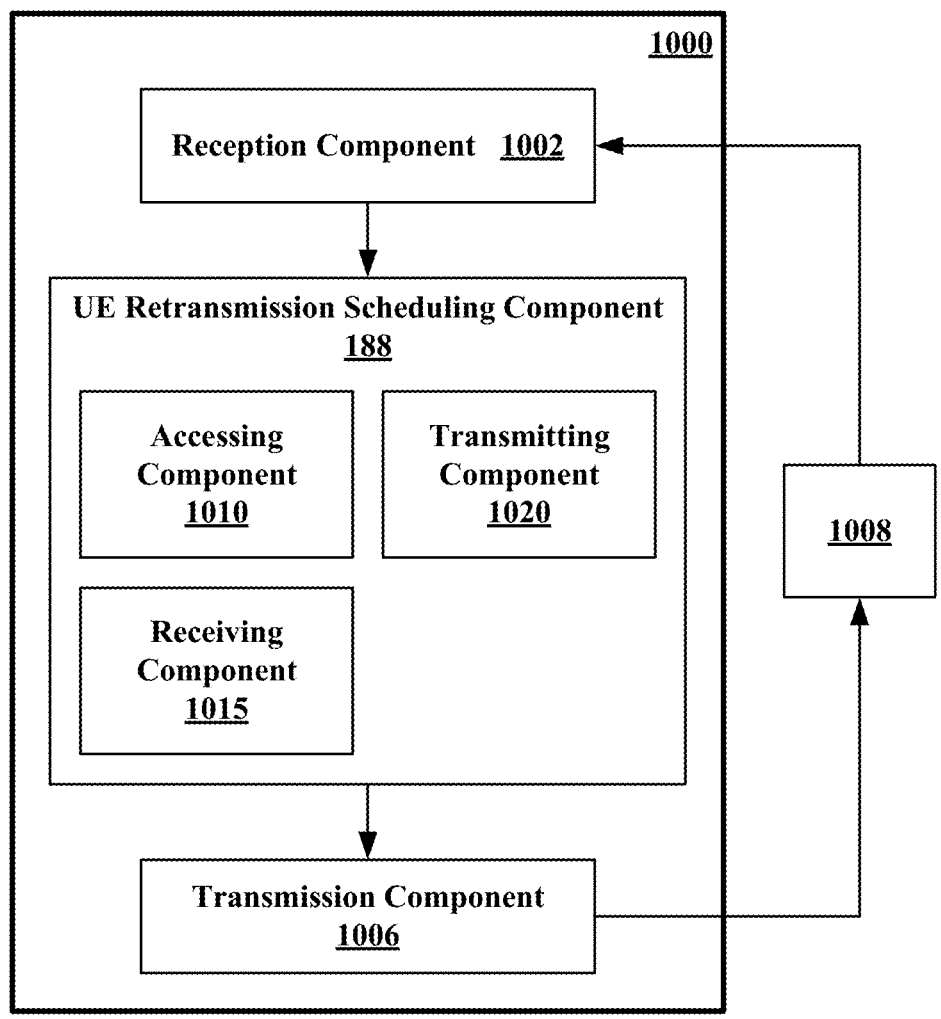
FIG. 10 is a diagram illustrating an example apparatus, such as a user equipment (UE), for scheduling transmissions of TBs, in accordance with various aspects of the present disclosure.

FIG. 10 is a block diagram of an example apparatus 1000 for wireless communication. The apparatus 1000 may be a UE 104 (e.g., UE 104 of FIGS. 1 and 3) or a UE 104 may include the apparatus 1000. In some aspects, the apparatus 1000 may include a reception component 1002 configured to receive wireless communications from another apparatus (e.g., apparatus 1008), a UE retransmission scheduling component 198 configured to receive scheduled transmissions of TBs, a transmission component 1006 configured to transmit wireless communications to another apparatus (e.g., apparatus 1008), and which may be in communication with one another (e.g., via buses or electrical connections). As shown, the apparatus 1000 may be in communication with another apparatus 1008 (such as a base station 102, or another wireless communication device) using the reception component 1002 and the transmission component 1006.

In some aspects, the apparatus 1000 may be configured to perform one or more operations described herein in connection with FIGS. 1 and 3-6. Alternatively or additionally, the apparatus 1000 may be configured to perform one or more processes described herein, such as method 1100 of FIGS. 11-12. In some aspects, the apparatus 1000 may include one or more components of the base station 102 described above in connection with FIGS. 1 and 3.

The reception component 1002 may receive communications, such as reference signals, control information, data communications, or a combination thereof, from the apparatus 1008. The reception component 1002 may provide received communications to one or more other components of the apparatus 1000, such as the UE retransmission scheduling component 198. In some aspects, the reception component 1002 may perform signal processing on the received communications (such as filtering, amplification, demodulation, analog-to-digital conversion, demultiplexing, de-interleaving, de-mapping, equalization, interference cancellation, or decoding, among other examples), and may provide the processed signals to the one or more other components. In some aspects, the reception component 1002 may include one or more antennas, a demodulator, a MIMO detector, a receive processor, a controller/processor, a memory, or a combination thereof, of the UE 104 described above in connection with FIGS. 1 and 3.

The transmission component 1006 may transmit communications, such as reference signals, control information, data communications, or a combination thereof, to the apparatus 1008. In some aspects, the UE retransmission scheduling component 198 may generate communications and may transmit the generated communications to the transmission component 1006 for transmission to the apparatus 1008. In some aspects, the transmission component 1006 may perform signal processing on the generated communications (such as filtering, amplification, modulation, digital-to-analog conversion, multiplexing, interleaving, mapping, or encoding, among other examples), and may transmit the processed signals to the apparatus 1008. In other aspects, the transmission component 1006 may include one or more antennas, a modulator, a transmit MIMO processor, a transmit processor, a controller/processor, a memory, or a combination thereof, of the UE 104 described above in connection with FIGS. 1 and 3. In some aspects, the transmission component 1006 may be co-located with the reception component 1002 in a transceiver or transceiver component.

The UE retransmission scheduling component 198 may be configured to receive scheduled transmissions of TBs. In some aspects, the UE retransmission scheduling component 198 may include a set of components, such as an accessing component 1010 configured to access static transmission information, a receiving component 1015 configured to receive a first DCI, a first transmission, second DCI, and a second transmission, and a transmitting component 1020 configured to transmit an indication of at least one code block that failed to be successfully decoded.

Alternatively or additionally, the set of components may be separate and distinct from the UE retransmission scheduling component 198. In other aspects, one or more components of the set of components may include or may be implemented within a controller/processor (e.g., the TX processor 356, the RX processor 353, the controller/processor 355), a memory (e.g., the memory 357), or a combination thereof, of the UE 104 described in FIGS. 1 and 3. Alternatively or additionally, one or more components of the set of components may be implemented at least in part as software stored in a memory, such as the memory 357. For example, a component (or a portion of a component) may be implemented as computer-executable instructions or code stored in a computer-readable medium (e.g., a non-transitory computer-readable medium) and executable by a controller or a processor to perform the functions or operations of the component.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIGS. 1 and 3.

Figure 11:
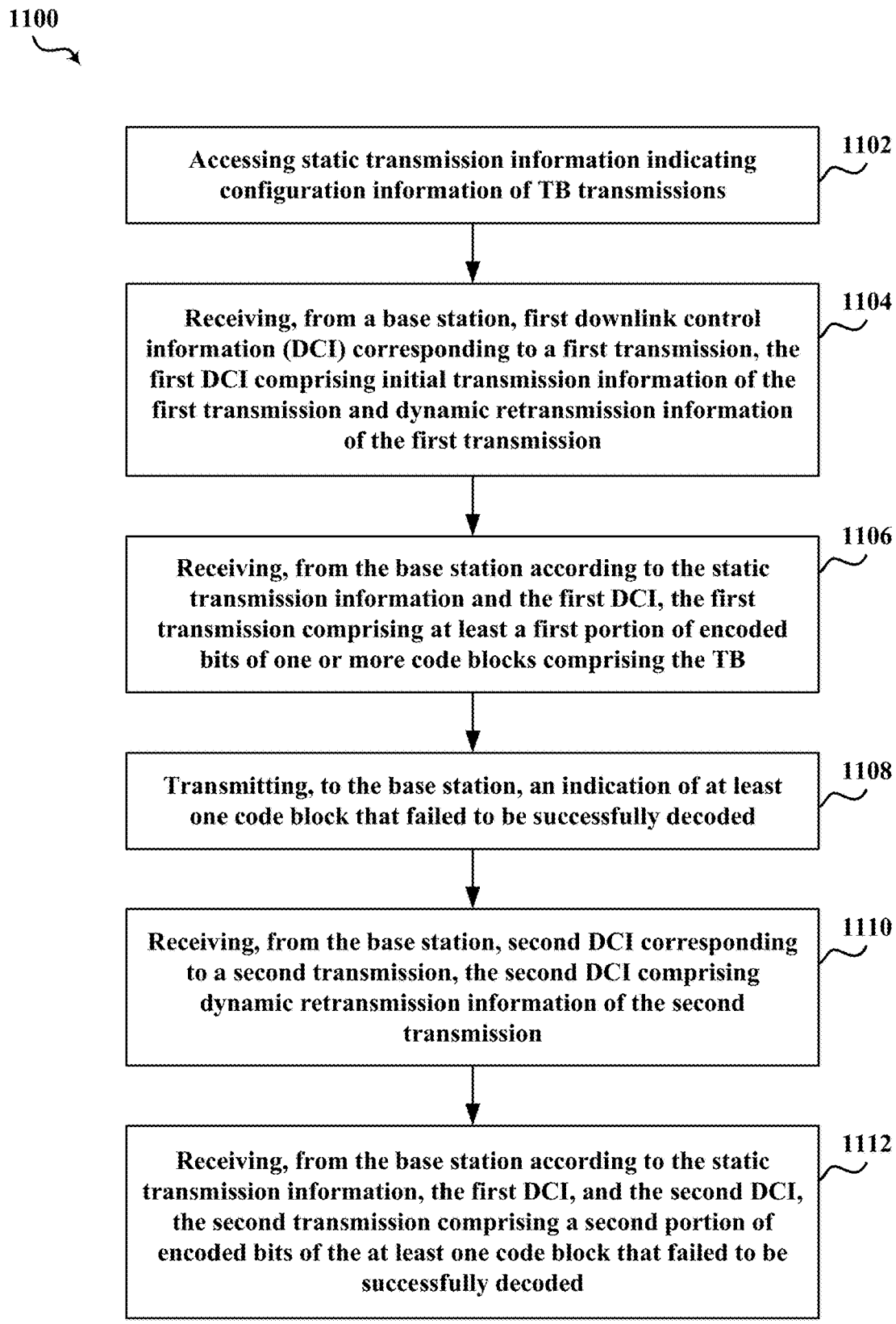
FIG. 11 is a flowchart of a method of scheduling transmissions of TBs at a UE, in accordance with various aspects of the present disclosure.
Figure 12:
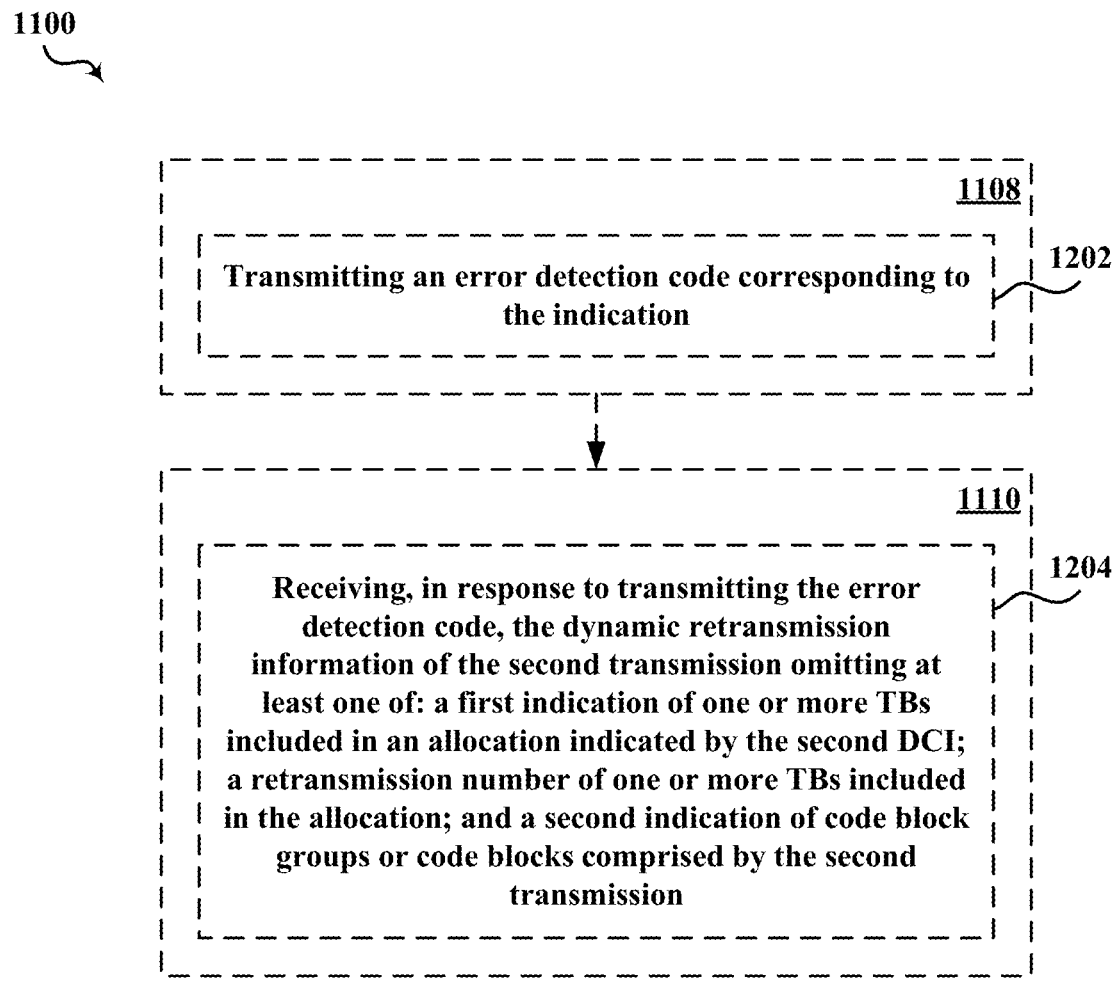
FIG. 12 is a flowchart of additional or optional steps for the method of scheduling transmissions of the TB at the UE, in accordance with various aspects of the present disclosure.

Referring to FIGS. 10-12, in operation, a UE 104 may perform a method 1100 of scheduling transmissions of TBs. The method 1100 may be performed by the apparatus 1000 (which may include the memory 357 and which may be the entire UE 104 and/or one or more components of the UE 104 such as the UE retransmission scheduling component 198, the TX processor 356, the RX processor 353, and/or the controller/processor 355). The method 1100 may be performed by the UE retransmission scheduling component 198 in communication with the base station 102.

At block 1102 of FIG. 11, the method 1100 includes accessing static transmission information indicating configuration information of TB transmissions. For example, in an aspect, the UE 104, the UE retransmission scheduling component 198, and/or the accessing component 1010 may be configured to or may comprise means for accessing static transmission information indicating configuration information of TB transmissions.

For example, the accessing at block 1102 may include accessing a predetermined transmission information according to an initial MCS to obtain scheduling information corresponding a transmission number, as described above in reference to FIGS. 4-6. For example, the UE 104 may use the scheduling information to receive the first transmission of the transport block and subsequent retransmissions of the transport block.

In some aspects, the accessing at block 1102 may include receiving updated predetermined transmission information via RRC signaling and updating the predetermined transmission information with the updated information.

Further, for example, the accessing at block 1102 may be performed to access transmission scheduling information that may be constant (e.g., fixed) and/or predetermined prior to starting the link adaptation procedure and/or transmission of one or more transport blocks. Further, the predetermined transmission information may not be transmitted to the UE 104, and, as such, may reduce signaling overhead associated with the transmission and/or retransmission of the transport block.

In other optional or additional aspects, the static transmission information may comprise a set of configuration information that is indexed by initial MCS and transmission number. The set of configuration information may comprise at least one of coding parameters and partial allocation sizes.

In other optional or additional aspects, the static transmission information may comprise a plurality of sets of configuration information that are indexed by initial MCS and transmission number. Each set of the plurality of sets of configuration information may comprise at least one of coding parameters and partial allocation sizes.

At block 1104 of FIG. 11, the method 1100 includes receiving, from a base station, first downlink control information (DCI) corresponding to a first transmission, the first DCI comprising initial transmission information of the first transmission and dynamic retransmission information of the first transmission. For example, in an aspect, the UE 104, the UE retransmission scheduling component 198, and/or the receiving component 1015 may be configured to or may comprise means for receiving, from a base station 102, a first DCI corresponding to a first transmission, the first DCI comprising initial transmission information of the first transmission and dynamic retransmission information of the first transmission.

For example, the receiving at block 1104 may include receiving the first DCI comprising the initial transmission information of the first transmission and the dynamic retransmission information of the first transmission for the transport block, as described above in reference to FIGS. 5 and 6.

In some aspects, the first DCI may further comprise initial transmission information and dynamic retransmission information corresponding to one or more other transport blocks included in the first transmission. That is, a slot allocation of the first transmission may include one or more transport blocks, as described above in reference to FIG. 4.

Further, for example, the receiving at block 1104 may be performed to schedule transmission of the first transmission of the transport block.

In other optional or additional aspects, the initial transmission information may indicate the initial MCS. Alternatively or additionally, the dynamic retransmission information may comprise a transport block identifier, a transmission number, and an indication of a TB comprised by the first transmission or of code block groups or code blocks comprised by the first transmission.

In other optional or additional aspects, the initial transmission information may indicate the initial MCS and a selected set of the plurality of sets of configuration information. Alternatively or additionally, the dynamic retransmission information may comprise a transport block identifier, a transmission number, and an indication of a TB comprised by the first transmission or of code block groups or code blocks comprised by the first transmission.

In other optional or additional aspects, the initial transmission information may indicate the initial MCS and a selected set of the plurality of sets of configuration information, and may comprise one or more additional and/or overriding values corresponding to one or more coding parameters and partial allocation sizes of the selected set of the plurality of sets of configuration information. Alternatively or additionally, the dynamic retransmission information may comprise a transport block identifier, a transmission number, and an indication of a TB comprised by the first transmission or of code block groups or code blocks comprised by the first transmission.

In other optional or additional aspects, the initial transmission information may indicate the initial MCS and a selected set of the plurality of sets of configuration information, and may comprise one or more additional and/or overriding values corresponding to one or more coding parameters and partial allocation sizes of the selected set of the plurality of sets of configuration information. Alternatively or additionally, the dynamic retransmission information may comprise a transport block identifier, a transmission number, an indication of a TB comprised by the first transmission or of code block groups or code blocks comprised by the first transmission, and one or more additional and/or overriding values corresponding to one or more coding parameters and partial allocation sizes of the selected set of the plurality of sets of configuration information.

In other optional or additional aspects, the dynamic retransmission information may comprise a transport block identifier comprising a common prefix identifying a HARQ process associated with one or more transport blocks comprised by one or more transmissions corresponding to the HARQ process, and a unique suffix identifying the transport block within the HARQ process.

At block 1106 of FIG. 11, the method 1100 includes receiving, from the base station according to the static transmission information and the first DCI, the first transmission comprising at least a first portion of encoded bits of one or more code blocks comprising the TB. For example, in an aspect, the UE 104, the UE retransmission scheduling component 198, and/or the receiving component 1015 may be configured to or may comprise means for receiving, from the base station 102 according to the static transmission information and the first DCI, the first transmission comprising at least a first portion of encoded bits of one or more code blocks comprising the TB.

For example, the receiving at block 1106 may include receiving one or more code blocks and/or code block groups of the transport block as configured by the first DCI.

In some aspects, the first transmission may further comprise one or more code blocks and/or code block groups of one or more other transport blocks. That is, a slot allocation of the first transmission may include one or more transport blocks (e.g., retransmissions of portions of transport blocks that failed to be successfully decoded, initial transmissions of other portions of other transport blocks), as described above in reference to FIG. 4.

Further, for example, the receiving at block 1106 may be performed to start receiving the transport block from the base station 102.

At block 1108 of FIG. 11, the method 1100 includes transmitting, to the base station, an indication of at least one code block that failed to be successfully decoded. For example, in an aspect, the UE 104, the UE retransmission scheduling component 198, and/or the transmitting component 1020 may be configured to or may comprise means for transmitting, to the base station 102, an indication of at least one code block that failed to be successfully decoded.

For example, the transmitting at block 1108 may include decoding the one or more code blocks and/or code grounds received at block 1106. In some aspects, the transmitting at block 1108 may include determining which, if any, of one or more code blocks and/or code grounds received at block 1106 failed to be decoded successfully.

Further, for example, the transmitting at block 1108 may be performed to allow the base station 102 to retransmit a portion of the transport block that failed to be decoded successfully, rather than retransmitting the transport block entirely. As such, signaling overhead may be reduced and/or throughput may be increased, when compared to a conventional wireless communication system.

At block 1110 of FIG. 11, the method 1100 includes receiving, from the base station, second DCI corresponding to a second transmission, the second DCI comprising dynamic retransmission information of the second transmission. For example, in an aspect, the UE 104, the UE retransmission scheduling component 198, and/or the receiving component 1015 may be configured to or may comprise means for receiving, from the base station 102, second DCI corresponding to a second transmission, the second DCI comprising dynamic retransmission information of the second transmission.

For example, the receiving at block 1110 may include receiving the second DCI comprising the initial transmission information of the second transmission and the dynamic retransmission information of the second transmission for the transport block, as described above in reference to FIGS. 5 and 6.

In some aspects, the second DCI may further comprise initial transmission information and dynamic retransmission information corresponding to one or more other transport blocks included in the second transmission. That is, a slot allocation of the second transmission may include one or more transport blocks (e.g., retransmissions of portions of transport blocks that failed to be successfully decoded, initial transmissions of other portions of other transport blocks), as described above in reference to FIG. 4.

Further, for example, the receiving at block 1110 may be performed to schedule transmission of the second transmission of the transport block.

At block 1112 of FIG. 11, the method 1100 includes receiving, from the base station according to the static transmission information, the first DCI, and the second DCI, the second transmission comprising a second portion of encoded bits of the at least one code block that failed to be successfully decoded. For example, in an aspect, the UE 104, the UE retransmission scheduling component 198, and/or the receiving component 1015 may be configured to or may comprise means for receiving, from the base station according to the static transmission information, the first DCI, and the second DCI, the second transmission comprising a second portion of encoded bits of the at least one code block that failed to be successfully decoded.

For example, the receiving at block 1112 may include receiving one or more code blocks and/or code block groups of the transport block as configured by the second DCI. That is, the receiving at block 1112 may include receiving one or more code blocks and/or code block groups indicated, at block 1108, as having failed to be decoded successfully.

In some aspects, the second transmission may further comprise one or more code blocks and/or code block groups of one or more other transport blocks. That is, a slot allocation of the second transmission may include one or more transport blocks, as described above in reference to FIG. 4.

Further, for example, the receiving at block 1112 may be performed to continue receiving the transport block from the base station 102.

Referring to FIG. 12, in an optional or additional aspect that may be combined with any other aspect, at block 1202, the transmitting, at block 1108 of method 1100, to the base station, of the indication of the at least one code block that failed to be successfully decoded comprises transmitting an error detection code corresponding to the indication. For example, in an aspect, the UE 104, the UE retransmission scheduling component 198, and/or the transmitting component 1020 may be configured to or may comprise means for transmitting an error detection code corresponding to the indication.

For example, the transmitting at block 1202 may include processing the indication information with an algorithm configured to generate the error detection code (e.g., CRC algorithm).

Further, for example, the transmitting at block 1202 may be performed to allow the base station 102 to determine whether the indication received from the UE 104 was received and decoded correctly. The determination may allow the base station 102 to omit one or more parameters from a subsequent DCI, and, as such, may reduce signaling overhead associated with the transmission of the transport block.

In this optional or additional aspect, at block 1204, the receiving, at block 1110 of method 1100, from the base station, of the second DCI corresponding to the second transmission comprises receiving, in response to transmitting the error detection code, the dynamic retransmission information of the second transmission omitting at least one of: a first indication of one or more TBs included in an allocation indicated by the second DCI; a retransmission number of one or more TBs included in the allocation; and a second indication of a TB comprised by the second transmission or of code block groups or code blocks comprised by the second transmission. For example, in an aspect, the UE 104, the UE retransmission scheduling component 198, and/or the receiving component 1015 may be configured to or may comprise means for receiving, in response to transmitting the error detection code, the dynamic retransmission information of the second transmission omitting at least one of: a first indication of one or more TBs included in an allocation indicated by the second DCI; a retransmission number of one or more TBs included in the allocation; and a second indication of a TB comprised by the second transmission or of code block groups or code blocks comprised by the second transmission.

For example, the receiving at block 1204 may include receiving dynamic retransmission information that omits the transport block identifiers of the transport blocks included in the retransmission. That is, the retransmission from the base station 102 may include the transport blocks sorted in a predetermined order (e.g., ascending, descending) according to the transmission number of the respective transport blocks.

In some aspects, the receiving at block 1204 may include receiving dynamic retransmission information that omits the transmission number for each transport block in the transmission. That is, the UE 104 may derive the transmission number by increasing a counter for each failed transmission. Alternatively or additionally, the base station 102 may transmit another DCI indicating a transmission number for the transport block and may cause the UE 104 to reset the derived transmission number to the transmission number indicated by the new DCI.

In other optional or additional aspects, the receiving at block 1204 may include receiving dynamic retransmission information that omits the CBG/CB bitmap for each transport block in the transmission. As both the base station 102 (e.g., transmitting device) and the UE 104 (e.g., receiving device) have the indication of the CBGs and/or CBs that failed to be decoded successfully in the previous transmission, the CBG/CB bitmap indicating the CBGs and/or CBs included in the subsequent transmission may be omitted. That is, the UE 104 may derive the CBGs and/or CBs included in the subsequent transmission based on the CBGs and/or CBs that failed to be decoded successfully in the previous transmission.

Further, for example, the receiving at block 1204 may be performed to reduce signaling overhead associated with the transmission of the transport block, when compared to a size of the signaling overhead used by a conventional wireless communication system. Further, aspects presented herein may improve throughput of wireless communication devices, when compared to a conventional communication system.

Figure 13:
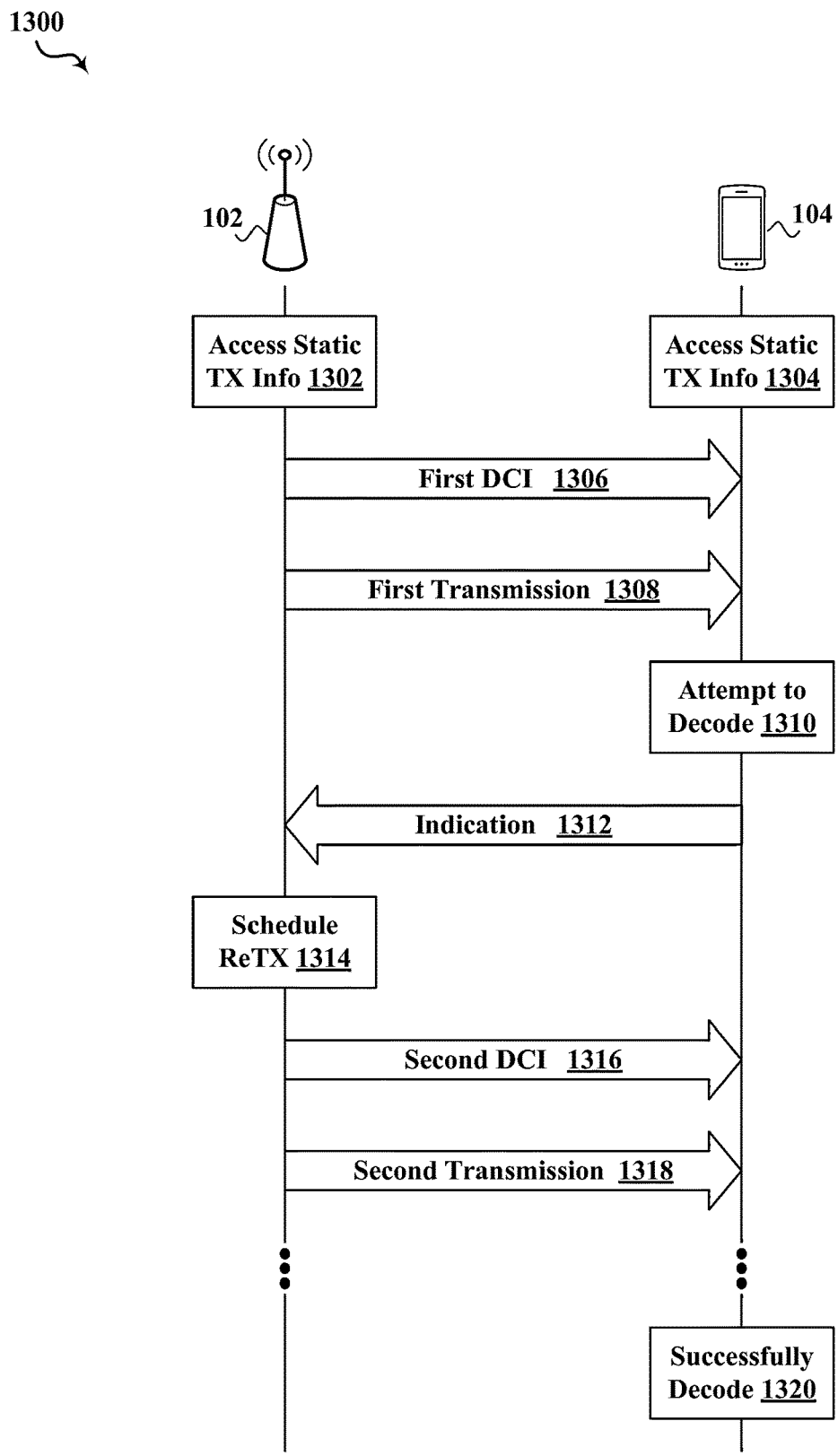
FIG. 13 is a diagram of an example call flow diagram for scheduling transmissions of TBs between a base station and a UE in a wireless communication system, in accordance with various aspects of the present disclosure.

FIG. 13 is a diagram illustrating an example call flow 1300 for scheduling transmissions of TBs between a base station 102 and a UE 104 in a wireless communication system 100. The base station 102 may include a BS retransmission scheduling component 188. The UE 104 may include a UE retransmission scheduling component 198.

The base station 102 may, at 1302, access static transmission information that may be stored by the base station 102 and/or may be accessible to the base station 102. As discussed above in reference to FIGS. 5-6 and 8, the static transmission information generally refer to transmission scheduling information that may be constant (e.g., fixed) and/or predetermined prior to starting the link adaptation procedure. For example, the static transmission information may comprise one or more sets of scheduling configuration information that may be indexed by initial MCS and transmission number.

Similarly, at 1304, the UE 104 may access static transmission information that may be stored by the UE 104 and/or may be accessible to the UE 104, as discussed above in reference to FIGS. 4-6 and 11.

By using the static transmission information as described herein, a size of the signaling overhead used to schedule the transmissions may be reduced when compared to a size of the signaling overhead used by a conventional wireless communication system.

As shown at 1306, the base station 102 may transmit a first DCI to the UE 104. The first DCI may correspond to a first transmission (e.g., first transmission 1308) and comprise transmission scheduling information for the first transmission. That is, the first DCI may comprise initial transmission information of the first transmission and dynamic retransmission information of the first transmission, as discussed above in reference to FIGS. 4-6 and 8. For example, the first DCI may comprise an indication of the initial MCS selected by the base station 102 from the static transmission information. In some aspects, the UE 104 may receive the first DCI from the base station 102 and obtain transmission scheduling information from the static transmission information according to the initial MCS indicated by the first DCI, as described above in reference to FIGS. 4-6 and 11.

The base station 102 may, at 1308, transmit the first transmission to the UE 104 according to the static transmission information and the first DCI. For example, the first transmission may comprise at least a first portion of encoded bits of one or more code blocks comprising the transport block, as described above in reference to FIGS. 4-6 and 8. Alternatively or additionally, the first transmission may also comprise at least one portion of one or more other transport blocks as described above in reference to FIG. 4.

The UE 104 may receive, at 1308, the first transmission transmitted by the base station 102, as described above in reference to FIG. 11. At 1310, the UE 104 may attempt to decode the first transmission received from the base station 102, as described above in reference to FIGS. 6 and 11.

At 1312, the UE 104 may transmit, to the base station 102, an indication (e.g., ACK/NACK) that at least one code block, comprised by the first transmission transmitted at 1308, failed to be successfully decoded at 1310. As described above in reference to FIG. 6, the indication may indicate whether a code block and/or a code block group was not successfully decoded.

In response to the indication received at 1317, the base station may, at 1314, schedule retransmission of at least the portion of the transport block that failed to be successfully decoded by the UE 104. Subsequently, at 1316, the base station may transmit a second DCI corresponding to a second transmission. The second DCI may comprise dynamic retransmission information of the second transmission, as described above with reference to FIGS. 6, 8, and 11. For example, the second DCI may indicate at least the portion of the transport block that failed to be successfully decoded by the UE 104 that may be included in the second transmission.

At 1318, the base station 102 may retransmit a second transmission to the UE 104, according to the static transmission information, the first DCI, and the second DCI, as described above with reference to FIGS. 6, 8, and 11. For example, the base station 102 may transmit the second transmission using a MCS indicated by static transmission information according to the initial MCS and the transmission number. The second transmission may comprise a second portion of encoded bits of the at least one code block that failed to be successfully decoded by the UE 104. Alternatively or additionally, the second transmission may also comprise at least one portion of one or more other transport blocks as described above in reference to FIG. 4.

The above procedure may be repeated, as necessary or for a configurable number of times (e.g., maximum number of retransmissions) or until the UE 104 successfully decodes the respective transport block at 1320.

Thus, the call flow 1300 represents one example of scheduling transmissions of transport blocks between the base station 102 and the UE 104 in which a size of the signaling overhead used to schedule the transmissions may be reduced when compared to a size of the signaling overhead used by a conventional wireless communication system.

Implementation examples are described in the following numbered clauses

1. A method of scheduling transmissions of TBs at a base station of a wireless communication network, comprising:
   accessing static transmission information indicating configuration information of TB transmissions;
   transmitting, to a UE, a first DCI corresponding to a first transmission, the first DCI comprising initial transmission information of the first transmission and dynamic retransmission information of the first transmission;
   transmitting, to the UE according to the static transmission information and the first DCI, the first transmission comprising at least a first portion of encoded bits of one or more code blocks comprising the TB;
   receiving, from the UE, an indication of at least one code block that failed to be successfully decoded;
   transmitting, to the UE, second DCI corresponding to a second transmission, the second DCI comprising dynamic retransmission information of the second transmission; and
   retransmitting, to the UE according to the static transmission information, the first DCI, and the second DCI, the second transmission comprising a second block of encoded bits of the at least one code block that failed to be successfully decoded.

2. The method of clause 1,
   wherein the static transmission information comprises a set of configuration information that is indexed by initial MCS and transmission number, the set of configuration information comprising at least one of coding parameters and partial allocation sizes;
   wherein the initial transmission information indicates the initial MCS; and
   wherein the dynamic retransmission information comprises:
      a TB identifier comprising a hybrid automatic repeat request (HARQ) process identification;
      a transmission number; and
      an indication of a TB comprised by the second transmission or of code block groups or code blocks comprised by the second transmission.

3. The method of clause 1 or 2,
   wherein the static transmission information comprises a plurality of sets of configuration information that are indexed by initial MCS and transmission number, each set of the plurality of sets of configuration information comprising at least one of coding parameters and partial allocation sizes;
   wherein the initial transmission information indicates the initial MCS and a selected set of the plurality of sets of configuration information; and
   wherein the dynamic retransmission information comprises:
      a TB identifier comprising a hybrid automatic repeat request (HARQ) process identification;

a transmission number; and
an indication of a TB comprised by the second transmission or of code block groups or code blocks comprised by the second transmission.

4. The method of any preceding clause 1 to 3,
wherein the static transmission information comprises a plurality of sets of configuration information that are indexed by initial MCS and transmission number, each set of the plurality of sets of configuration information comprising at least one of coding parameters and partial allocation sizes;
wherein the initial transmission information comprises:
a first indication of the initial MCS;
a second indication of a selected set of the plurality of sets of configuration information; and
one or more additional or overriding values corresponding to one or more coding parameters and partial allocation sizes of the selected set of the plurality of sets of configuration information; and
wherein the dynamic retransmission information comprises:
a TB identifier comprising a hybrid automatic repeat request (HARQ) process identification;
a transmission number; and
an indication of a TB comprised by the second transmission or of code block groups or code blocks comprised by the second transmission.

5. The method of any preceding clause 1 to 4,
wherein the static transmission information comprises a plurality of sets of configuration information that are indexed by initial MCS and transmission number, each set of the plurality of sets of configuration information comprising at least one of coding parameters and partial allocation sizes;
wherein the initial transmission information comprises:
a first indication of the initial MCS;
a second indication of a selected set of the plurality of sets of configuration information; and one or more first additional or overriding values corresponding to one or more first coding parameters and partial allocation sizes of the selected set of the plurality of sets of configuration information; and
wherein the dynamic retransmission information comprises:
a TB identifier comprising a hybrid automatic repeat request (HARQ) process identification;
a transmission number;
an indication of a TB comprised by the second transmission or of code block groups or code blocks comprised by the second transmission; and
one or more second additional or overriding values corresponding to one or more second coding parameters and partial allocation sizes of the selected set of the plurality of sets of configuration information.

6. The method of any preceding clause 1 to 5, wherein the dynamic retransmission information comprises a TB identifier comprising:
a common prefix identifying a HARQ process associated with one or more TBs comprised by one or more transmissions corresponding to the HARQ process; and
a unique suffix identifying the TB within the HARQ process.

7. The method of any preceding clause 1 to 6,
wherein receiving the indication of the at least one code block that failed to be successfully decoded comprises receiving an error detection code corresponding to the indication; and
wherein transmitting the second DCI corresponding to the second transmission comprises omitting, in response to receiving the error detection code, from the dynamic retransmission information of the second transmission at least one of:
a first indication of one or more TBs included in an allocation indicated by the second DCI;
a retransmission number of one or more TBs included in the allocation; and
a second indication of a TB comprised by the second transmission or of code block groups or code blocks comprised by the second transmission.

8. An apparatus of scheduling transmissions of TBs at a base station of a wireless communication network, comprising a memory storing instructions, and a processor communicatively coupled with the memory and configured to execute the instructions to perform one or more methods of any preceding clause 1 to 7.

9. An apparatus of scheduling transmissions of TBs at a base station of a wireless communication network, comprising means for performing one or more methods of any preceding clause 1 to 7.

10. A computer-readable medium storing instructions of scheduling transmissions of TBs at a base station of a wireless communication network, executable by a processor, to perform one or more methods of any preceding clause 1 to 7.

11. A method of scheduling transmissions of TBs at a UE of a wireless communication network, comprising:
accessing static transmission information indicating configuration information of TB transmissions;
receiving, from a base station, a first DCI corresponding to a first transmission, the first DCI comprising initial transmission information of the first transmission and dynamic retransmission information of the first transmission;
receiving, from the base station according to the static transmission information and the first DCI, the first transmission comprising at least a first
portion of encoded bits of one or more code blocks comprising the TB; transmitting, to the base station, an indication of at least one code block that failed to be successfully decoded;
receiving, from the base station, second DCI corresponding to a second transmission, the second DCI comprising dynamic retransmission information of the second transmission; and
receiving, from the base station according to the static transmission information, the first DCI, and the second DCI, the second transmission comprising a second portion of encoded bits of the at least one code block that failed to be successfully decoded.

12. The method of clause 11,
wherein the static transmission information comprises a set of configuration information that is indexed by initial MCS and transmission number, the set of configuration information comprising at least one of coding parameters and partial allocation sizes;
wherein the initial transmission information indicates the initial MCS; and
wherein the dynamic retransmission information comprises:
a TB identifier comprising a hybrid automatic repeat request (HARQ) process identification;
a transmission number; and an indication of a TB comprised by the second transmission or of code block groups or code blocks comprised by the second transmission.

13. The method of clause 11 or 12,
wherein the static transmission information comprises a plurality of sets of configuration information that are indexed by initial MCS and transmission number, each set of the plurality of sets of configuration information comprising at least one of coding parameters and partial allocation sizes;
wherein the initial transmission information indicates the initial MCS and a selected set of the plurality of sets of configuration information; and
wherein the dynamic retransmission information comprises:
  a TB identifier comprising a hybrid automatic repeat request (HARQ) process identification;
  a transmission number; and
  an indication of a TB comprised by the second transmission or of code block groups or code blocks comprised by the second transmission.

14. The method of any preceding clause 11 to 13,
wherein the static transmission information comprises a plurality of sets of configuration information that are indexed by initial MCS and transmission number, each set of the plurality of sets of configuration information comprising at least one of coding parameters and partial allocation sizes;
wherein the initial transmission information comprises:
  a first indication of the initial MCS;
  a second indication of a selected set of the plurality of sets of configuration information; and
  one or more additional or overriding values corresponding to one or more coding parameters and partial allocation sizes of the selected set of the plurality of sets of configuration information; and
wherein the dynamic retransmission information comprises:
  a TB identifier comprising a hybrid automatic repeat request (HARQ) process identification;
  a transmission number; and
  an indication of a TB comprised by the second transmission or of code block groups or code blocks comprised by the second transmission.

15. The method of any preceding clause 11 to 14,
wherein the static transmission information comprises a plurality of sets of configuration information that are indexed by initial MCS and transmission number, each set of the plurality of sets of configuration information comprising at least one of coding parameters and partial allocation sizes;
wherein the initial transmission information comprises:
  a first indication of the initial MCS;
  a second indication of a selected set of the plurality of sets of configuration information; and
  one or more first additional or overriding values corresponding to one or more first coding parameters and partial allocation sizes of the selected set of the plurality of sets of configuration information; and
wherein the dynamic retransmission information comprises:
  a TB identifier comprising a hybrid automatic repeat request (HARQ) process identification;
  a transmission number;
  an indication of a TB comprised by the second transmission or of code block groups or code blocks comprised by the second transmission; and
  one or more second additional or overriding values corresponding to one or more second coding parameters and partial allocation sizes of the selected set of the plurality of sets of configuration information.

16. The method of any preceding clause 11 to 15, wherein the dynamic retransmission information comprises a TB identifier comprising:
  a common prefix identifying a HARQ process associated with one or more TBs comprised by one or more transmissions corresponding to the HARQ process; and
  a unique suffix identifying the TB within the HARQ process.

17. The method of any preceding clause 11 to 16,
wherein transmitting the indication of the at least one code block that failed to be successfully decoded comprises transmitting an error detection code corresponding to the indication; and
wherein receiving the second DCI corresponding to the second transmission comprises receiving, in response to transmitting the error detection code, the dynamic retransmission information of the second transmission omitting at least one of:
  a first indication of one or more TBs included in an allocation indicated by the second DCI;
  a retransmission number of one or more TBs included in the allocation; and
  a second indication of a TB comprised by the second transmission or of code block groups or code blocks comprised by the second transmission.

18. An apparatus of scheduling transmissions of TBs at a UE of a wireless communication network, comprising a memory storing instructions, and a processor communicatively coupled with the memory and configured to execute the instructions to perform one or more methods of any preceding clause 11 to 17.

19. An apparatus of scheduling transmissions of TBs at a UE of a wireless communication network, comprising means for performing one or more methods of any preceding clause 11 to 17.

20. A computer-readable medium storing instructions of scheduling transmissions of TBs at a UE of a wireless communication network, executable by a processor, to perform one or more methods of any preceding clause 11 to 17.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of scheduling transmissions of transport blocks (TBs) at a base station of a wireless communication network, comprising:
    accessing static transmission information indicating configuration information of TB transmissions;
    transmitting, to a user equipment (UE), first downlink control information (DCI) corresponding to a first transmission, the first DCI comprising initial transmission information of the first transmission and dynamic retransmission information of the first transmission;
    transmitting, to the UE according to the static transmission information and the first DCI, the first transmission comprising at least a first portion of encoded bits of one or more code blocks comprising the TB;
    receiving, from the UE, an indication of at least one code block that failed to be successfully decoded;
    transmitting, to the UE, second DCI corresponding to a second transmission, the second DCI comprising dynamic retransmission information of the second transmission, wherein transmitting the second DCI corresponding to the second transmission comprises omitting from the dynamic retransmission information of the second transmission at least one of:
        a first parameter included within the first DCI and corresponding to one or more TBs in an allocation indicated by the second DCI;
        a second parameter set on the static transmission information indicating configuration information of TB transmissions; or
        a derivable attribute of the first transmission downlink control information or the static transmission information indicating configuration information of TB transmissions; and
    retransmitting, to the UE according to the static transmission information, the first DCI, and the second DCI, the second transmission comprising a second portion of encoded bits of the at least one code block that failed to be successfully decoded.

2. The method of claim 1,
    wherein the static transmission information comprises a set of configuration information that is indexed by initial modulation and coding scheme (MCS) and transmission number, the set of configuration information comprising at least one of coding parameters and partial allocation sizes;
    wherein the initial transmission information indicates the initial MCS; and
    wherein the dynamic retransmission information comprises:
        a TB identifier comprising a hybrid automatic repeat request (HARQ) process identification;
        a transmission number; and
        an indication of a TB comprised by the second transmission or of code block groups or code blocks comprised by the second transmission.

3. The method of claim 1,
    wherein the static transmission information comprises a plurality of sets of configuration information that are indexed by initial modulation and coding scheme (MCS) and transmission number, each set of the plurality of sets of configuration information comprising at least one of coding parameters and partial allocation sizes;
    wherein the initial transmission information indicates the initial MCS and a selected set of the plurality of sets of configuration information; and
    wherein the dynamic retransmission information comprises:
        a TB identifier comprising a hybrid automatic repeat request (HARQ) process identification;
        a transmission number; and
        an indication of a TB comprised by the second transmission or of code block groups or code blocks comprised by the second transmission.

4. The method of claim 1,
    wherein the static transmission information comprises a plurality of sets of configuration information that are indexed by initial modulation and coding scheme (MCS) and transmission number, each set of the plurality of sets of configuration information comprising at least one of coding parameters and partial allocation sizes;
    wherein the initial transmission information comprises:
        a first indication of the initial MCS;
        a second indication of a selected set of the plurality of sets of configuration information; and
        one or more additional or overriding values corresponding to one or more coding parameters and partial allocation sizes of the selected set of the plurality of sets of configuration information; and wherein the dynamic retransmission information comprises:
- a TB identifier comprising a hybrid automatic repeat request (HARQ) process identification;
- a transmission number; and
- an indication of a TB comprised by the second transmission or of code block groups or code blocks comprised by the second transmission.

5. The method of claim 1,
wherein the static transmission information comprises a plurality of sets of configuration information that are indexed by initial modulation and coding scheme (MCS) and transmission number, each set of the plurality of sets of configuration information comprising at least one of coding parameters and partial allocation sizes;

wherein the initial transmission information comprises:
- a first indication of the initial MCS;
- a second indication of a selected set of the plurality of sets of configuration information; and
- one or more first additional or overriding values corresponding to one or more first coding parameters and partial allocation sizes of the selected set of the plurality of sets of configuration information; and wherein the dynamic retransmission information comprises:
- a TB identifier comprising a hybrid automatic repeat request (HARQ) process identification;
- a transmission number;
- an indication of a TB comprised by the second transmission or of code block groups or code blocks comprised by the second transmission; and
- one or more second additional or overriding values corresponding to one or more second coding parameters and partial allocation sizes of the selected set of the plurality of sets of configuration information.

6. The method of claim 1, wherein the dynamic retransmission information comprises a TB identifier comprising:
- a common prefix identifying a hybrid automatic repeat request (HARQ) process associated with one or more TBs comprised by one or more transmissions corresponding to the HARQ process; and
- a unique suffix identifying the TB within the HARQ process.

7. The method of claim 1,
wherein receiving the indication of the at least one code block that failed to be successfully decoded comprises receiving an error detection code corresponding to the indication; and wherein omitting from the dynamic retransmission information of the second transmission further comprises omitting, in response to receiving the error detection code, from the dynamic retransmission information of the second transmission at least one of:
- a first indication of the one or more TBs included in the allocation indicated by the second DCI;
- a retransmission number of the one or more TBs included in the allocation; or
- a second indication of the TB comprised by the second transmission or of code block groups or code blocks comprised by the second transmission.

8. An apparatus of scheduling transmissions of transport blocks (TBs) at a base station of a wireless communication network, comprising:
- a memory storing instructions; and
- a processor communicatively coupled with the memory and configured to execute the instructions to:
  - access static transmission information indicating configuration information of TB transmissions;
  - transmit, to a user equipment (UE), first downlink control information (DCI) corresponding to a first transmission, the first DCI comprising initial transmission information of the first transmission and dynamic retransmission information of the first transmission;
  - transmit, to the UE according to the static transmission information and the first DCI, the first transmission comprising at least a first portion of one or more code blocks comprising the TB;
  - receive, from the UE, an indication of at least one code block that failed to be successfully decoded;
- transmit, to the UE, second DCI corresponding to a second transmission, the second DCI comprising dynamic retransmission information of the second transmission, wherein to transmit the second DCI corresponding to the second transmission comprises to omit from the dynamic retransmission information of the second transmission at least one of:
  - a first parameter included within the first DCI and corresponding to one or more TBs in an allocation indicated by the second DCI;
  - a second parameter set on the static transmission information indicating configuration information of TB transmissions; or
  - a derivable attribute of the first transmission downlink control information or the static transmission information indicating configuration information of TB transmissions; and
  - retransmit, to the UE according to the static transmission information, the first DCI, and the second DCI, the second transmission comprising a second portion of encoded bits of the at least one code block that failed to be successfully decoded.

9. The apparatus of claim 8,
wherein the static transmission information comprises a set of configuration information that is indexed by initial modulation and coding scheme (MCS) and transmission number, the set of configuration information comprising at least one of coding parameters and partial allocation sizes;

wherein the initial transmission information indicates the initial MCS; and wherein the dynamic retransmission information comprises:
- a TB identifier comprising a hybrid automatic repeat request (HARQ) process identification;
- a transmission number; and
- an indication of a TB comprised by the second transmission or of code block groups or code blocks comprised by the second transmission.

10. The apparatus of claim 8,
wherein the static transmission information comprises a plurality of sets of configuration information that are indexed by initial modulation and coding scheme (MCS) and transmission number, each set of the plurality of sets of configuration information comprising at least one of coding parameters and partial allocation sizes;

wherein the initial transmission information indicates the initial MCS and a selected set of the plurality of sets of configuration information; and wherein the dynamic retransmission information comprises:
 a TB identifier comprising a hybrid automatic repeat request (HARQ) process identification;
 a transmission number; and
 an indication of a TB comprised by the second transmission or of code block groups or code blocks comprised by the second transmission.

11. The apparatus of claim 8,
wherein the static transmission information comprises a plurality of sets of configuration information that are indexed by initial modulation and coding scheme (MCS) and transmission number, each set of the plurality of sets of configuration information comprising at least one of coding parameters and partial allocation sizes;
wherein the initial transmission information comprises:
 a first indication of the initial MCS;
 a second indication of a selected set of the plurality of sets of configuration information; and
 one or more additional or overriding values corresponding to one or more coding parameters and partial allocation sizes of the selected set of the plurality of sets of configuration information; and
wherein the dynamic retransmission information comprises:
 a TB identifier comprising a hybrid automatic repeat request (HARQ) process identification;
 a transmission number; and
 an indication of a TB comprised by the second transmission or of code block groups or code blocks comprised by the second transmission.

12. The apparatus of claim 8,
wherein the static transmission information comprises a plurality of sets of configuration information that are indexed by initial modulation and coding scheme (MCS) and transmission number, each set of the plurality of sets of configuration information comprising at least one of coding parameters and partial allocation sizes;
wherein the initial transmission information comprises:
 a first indication of the initial MCS;
 a second indication of a selected set of the plurality of sets of configuration information; and
 one or more first additional or overriding values corresponding to one or more first coding parameters and partial allocation sizes of the selected set of the plurality of sets of configuration information; and
wherein the dynamic retransmission information comprises:
 a TB identifier comprising a hybrid automatic repeat request (HARQ) process identification;
 a transmission number;
 an indication of a TB comprised by the second transmission or of code block groups or code blocks comprised by the second transmission; and
 one or more second additional or overriding values corresponding to one or more second coding parameters and partial allocation sizes of the selected set of the plurality of sets of configuration information.

13. The apparatus of claim 8, wherein the dynamic retransmission information comprises a TB identifier comprising:
 a common prefix identifying a hybrid automatic repeat request (HARQ) process associated with one or more TBs comprised by one or more transmissions corresponding to the HARQ process; and
 a unique suffix identifying the TB within the HARQ process.

14. The apparatus of claim 8,
wherein to receive the indication of the at least one code block that failed to be successfully decoded comprises to receive an error detection code corresponding to the indication; and
wherein to omit, in response to receiving the error detection code, from the dynamic retransmission information comprises to omit, in response to receiving the error detection code, from the dynamic retransmission information of the second transmission at least one of:
 a first indication of the one or more TBs included in an allocation indicated by the second DCI;
 a retransmission number of the one or more TBs included in the allocation; and
 a second indication of the TB comprised by the second transmission or of code block groups or code blocks comprised by the second transmission.

15. A method of scheduling transmissions of transport block (TBs) at a user equipment (UE) of a wireless communication network, comprising:
 accessing static transmission information indicating configuration information of TB transmissions;
 receiving, from a base station, first downlink control information (DCI) corresponding to a first transmission, the first DCI comprising initial transmission information of the first transmission and dynamic retransmission information of the first transmission;
 receiving, from the base station according to the static transmission information and the first DCI, the first transmission comprising at least a first portion of encoded bits of one or more code blocks comprising the TB;
 transmitting, to the base station, an indication of at least one code block that failed to be successfully decoded;
 receiving, from the base station, second DCI corresponding to a second transmission, the second DCI comprising dynamic retransmission information of the second transmission, wherein receiving the second DCI corresponding to the second transmission comprises receiving dynamic retransmission information of the second transmission omitting at least one of:
  a first parameter included within the first DCI and corresponding to one or more TBs in an allocation indicated by the second DCI;
  a second parameter set on the static transmission information indicating configuration information of TB transmissions; or
  a derivable attribute of the first transmission downlink control information or the static transmission information indicating configuration information of TB transmissions; and
 receiving, from the base station according to the static transmission information, the first DCI, and the second DCI, the second transmission comprising a second portion of encoded bits of the at least one code block that failed to be successfully decoded.

16. The method of claim 15,
wherein the static transmission information comprises a set of configuration information that is indexed by initial modulation and coding scheme (MCS) and transmission number, the set of configuration information comprising at least one of coding parameters and partial allocation sizes;
wherein the initial transmission information indicates the initial MCS; and wherein the dynamic retransmission information comprises:
a TB identifier comprising a hybrid automatic repeat request (HARQ) process identification;
a transmission number; and
an indication of a TB comprised by the second transmission or of code block groups or code blocks comprised by the second transmission.

17. The method of claim 15,
wherein the static transmission information comprises a plurality of sets of configuration information that are indexed by initial modulation and coding scheme (MCS) and transmission number, each set of the plurality of sets of configuration information comprising at least one of coding parameters and partial allocation sizes;
wherein the initial transmission information indicates the initial MCS and a selected set of the plurality of sets of configuration information; and
wherein the dynamic retransmission information comprises:
a TB identifier comprising a hybrid automatic repeat request (HARQ) process identification;
a transmission number; and
an indication of a TB comprised by the second transmission or of code block groups or code blocks comprised by the second transmission.

18. The method of claim 15,
wherein the static transmission information comprises a plurality of sets of configuration information that are indexed by initial modulation and coding scheme (MCS) and transmission number, each set of the plurality of sets of configuration information comprising at least one of coding parameters and partial allocation sizes;
wherein the initial transmission information comprises:
a first indication of the initial MCS;
a second indication of a selected set of the plurality of sets of configuration information; and
one or more additional or overriding values corresponding to one or more coding parameters and partial allocation sizes of the selected set of the plurality of sets of configuration information; and
wherein the dynamic retransmission information comprises:
a TB identifier comprising a hybrid automatic repeat request (HARQ) process identification;
a transmission number; and
an indication of a TB comprised by the second transmission or of code block groups or code blocks comprised by the second transmission.

19. The method of claim 15,
wherein the static transmission information comprises a plurality of sets of configuration information that are indexed by initial modulation and coding scheme (MCS) and transmission number, each set of the plurality of sets of configuration information comprising at least one of coding parameters and partial allocation sizes;
wherein the initial transmission information comprises:
a first indication of the initial MCS;
a second indication of a selected set of the plurality of sets of configuration information; and
one or more first additional or overriding values corresponding to one or more first coding parameters and partial allocation sizes of the selected set of the plurality of sets of configuration information; and
wherein the dynamic retransmission information comprises:
a TB identifier comprising a hybrid automatic repeat request (HARQ) process identification;
a transmission number;
an indication of a TB comprised by the second transmission or of code block groups or code blocks comprised by the second transmission; and
one or more second additional or overriding values corresponding to one or more second coding parameters and partial allocation sizes of the selected set of the plurality of sets of configuration information.

20. The method of claim 15, wherein the dynamic retransmission information comprises a TB identifier comprising:
a common prefix identifying a hybrid automatic repeat request (HARQ) process associated with one or more TBs comprised by one or more transmissions corresponding to the HARQ process; and
a unique suffix identifying the TB within the HARQ process.

21. The method of claim 15,
wherein transmitting the indication of the at least one code block that failed to be successfully decoded comprises transmitting an error detection code corresponding to the indication; and
wherein receiving, in response to transmitting the error detection code, the dynamic retransmission information of the second transmission comprises receiving, in response to transmitting the error detection code, the dynamic retransmission information of the second transmission omitting at least one of:
the first indication of the one or more TBs included in an allocation indicated by the second DCI;
the retransmission number of the one or more TBs included in the allocation; and
the second indication of the TB comprised by the second transmission or of code block groups or code blocks comprised by the second transmission.

22. An apparatus of scheduling transmissions of transport blocks (TBs) at a user equipment (UE) of a wireless communication network, comprising:
a memory storing instructions; and
a processor in communication with the memory and configured to execute the instructions to:
access static transmission information indicating configuration information of TB transmissions;
receive, from a base station, first downlink control information (DCI) corresponding to a first transmission, the first DCI comprising initial transmission information of the first transmission and dynamic retransmission information of the first transmission;
receive, from the base station according to the static transmission information and the first DCI, the first transmission comprising at least a first portion of encoded bits of one or more code blocks comprising the TB;
transmit, to the base station, an indication of at least one code block that failed to be successfully decoded;
receive, from the base station, second DCI corresponding to a second transmission, the second DCI comprising dynamic retransmission information of the second transmission, wherein to receive the second DCI corresponding to the second transmission comprises to receive the dynamic retransmission information of the second transmission omitting at least one of:

a first parameter included within the first DCI and corresponding to one or more TBs in an allocation indicated by the second DCI;

a second parameter set on the static transmission information indicating configuration information of TB transmissions; or a derivable attribute of the first transmission downlink control information or the static transmission information indicating configuration information of TB transmissions; and receive, from the base station according to the static transmission information, the first DCI, and the second DCI, the second transmission comprising a second portion of encoded bits of the at least one code block that failed to be successfully decoded.

23. The apparatus of claim 22,
wherein the static transmission information comprises a set of configuration information that is indexed by initial modulation and coding scheme (MCS) and transmission number, the set of configuration information comprising at least one of coding parameters and partial allocation sizes;
wherein the initial transmission information indicates the initial MCS; and
wherein the dynamic retransmission information comprises:
 a TB identifier comprising a hybrid automatic repeat request (HARQ) process identification;
 a transmission number; and
 an indication of a TB comprised by the second transmission or of code block groups or code blocks comprised by the second transmission.

24. The apparatus of claim 22,
wherein the static transmission information comprises a plurality of sets of configuration information that are indexed by initial modulation and coding scheme (MCS) and transmission number, each set of the plurality of sets of configuration information comprising at least one of coding parameters and partial allocation sizes;
wherein the initial transmission information indicates the initial MCS and a selected set of the plurality of sets of configuration information; and
wherein the dynamic retransmission information comprises:
 a TB identifier comprising a hybrid automatic repeat request (HARQ) process identification;
 a transmission number; and
 an indication of a TB comprised by the second transmission or of code block groups or code blocks comprised by the second transmission.

25. The apparatus of claim 22,
wherein the static transmission information comprises a plurality of sets of configuration information that are indexed by initial modulation and coding scheme (MCS) and transmission number, each set of the plurality of sets of configuration information comprising at least one of coding parameters and partial allocation sizes;
wherein the initial transmission information comprises:
 a first indication of the initial MCS;
 a second indication of a selected set of the plurality of sets of configuration information; and
 one or more additional or overriding values corresponding to one or more coding parameters and partial allocation sizes of the selected set of the plurality of sets of configuration information; and
wherein the dynamic retransmission information comprises:
 a TB identifier comprising a hybrid automatic repeat request (HARQ) process identification;
 a transmission number; and
 an indication of a TB comprised by the second transmission or of code block groups or code blocks comprised by the second transmission.

26. The apparatus of claim 22,
wherein the static transmission information comprises a plurality of sets of configuration information that are indexed by initial modulation and coding scheme (MCS) and transmission number, each set of the plurality of sets of configuration information comprising at least one of coding parameters and partial allocation sizes;
wherein the initial transmission information comprises:
 a first indication of the initial MCS;
 a second indication of a selected set of the plurality of sets of configuration information; and
 one or more first additional or overriding values corresponding to one or more first coding parameters and partial allocation sizes of the selected set of the plurality of sets of configuration information; and
wherein the dynamic retransmission information comprises:
 a TB identifier comprising a hybrid automatic repeat request (HARQ) process identification;
 a transmission number;
 an indication of a TB comprised by the second transmission or of code block groups or code blocks comprised by the second transmission; and
 one or more second additional or overriding values corresponding to one or more second coding parameters and partial allocation sizes of the selected set of the plurality of sets of configuration information.

27. The apparatus of claim 22, wherein the dynamic retransmission information comprises a TB identifier comprising:
a common prefix identifying a hybrid automatic repeat request (HARQ) process associated with one or more TBs comprised by one or more transmissions corresponding to the HARQ process; and
a unique suffix identifying the TB within the HARQ process.

28. The apparatus of claim 22,
wherein to transmit the indication of the at least one code block that failed to be successfully decoded comprises to transmit an error detection code corresponding to the indication; and
wherein to receive the second DCI corresponding to the second transmission comprises to receive, in response to transmitting the error detection code, the dynamic retransmission information of the second transmission omitting at least one of:
 a first indication of one or more TBs included in an allocation indicated by the second DCI;
 a retransmission number of one or more TBs included in the allocation; and
 a second indication of TB comprised by the second transmission or of code block groups or code blocks comprised by the second transmission.

* * * * *